(12) United States Patent
Lee et al.

(10) Patent No.: US 12,014,393 B2
(45) Date of Patent: Jun. 18, 2024

(54) ADVERTISEMENT MANAGEMENT DEVICE MANAGING ADVERTISEMENT PROVIDED VIA PLATFORM SERVER AND OPERATION METHOD OF ADVERTISEMENT MANAGEMENT DEVICE

(71) Applicant: NEXON KOREA CORPORATION, Seongnam-si (KR)

(72) Inventors: Do Ho Lee, Seongnam-si (KR); Gi Hye Kim, Seongnam-si (KR); Seung Woo Nam, Seongnam-si (KR); Sang Ki Lee, Seongnam-si (KR); Kyung Jang Cho, Seongnam-si (KR); Ho Yun Jung, Seongnam-si (KR); Jin Hyeong Ju, Seongnam-si (KR); Hak Lee, Seongnam-si (KR); Chang Su Lee, Seongnam-si (KR); Bit Na Yun, Seongnam-si (KR); Myoung Gon An, Seongnam-si (KR); Jang Won Lee, Seongnam-si (KR); Chel Kang, Seongnam-si (KR); Kyung Rae Cho, Seongnam-si (KR)

(73) Assignee: NEXON KOREA CORPORATION, Seongnam-si (KR)

(*) Notice: Subject to any disclaimer, the term of this patent is extended or adjusted under 35 U.S.C. 154(b) by 0 days.

(21) Appl. No.: 17/105,003

(22) Filed: Nov. 25, 2020

(65) Prior Publication Data
US 2021/0158388 A1 May 27, 2021

(30) Foreign Application Priority Data
Nov. 26, 2019 (KR) .................. 10-2019-0153771

(51) Int. Cl.
G06Q 30/02 (2023.01)
G06F 21/62 (2013.01)
(Continued)

(52) U.S. Cl.
CPC ..... *G06Q 30/0244* (2013.01); *G06Q 30/0246* (2013.01); *G06Q 30/0277* (2013.01); *G06F 21/6245* (2013.01)

(58) Field of Classification Search
CPC .......... G06Q 30/0244; G06Q 30/0246; G06Q 30/0277; G06Q 30/0251; G06Q 30/0242; G06F 21/6245; H04L 9/0861
See application file for complete search history.

(56) References Cited

U.S. PATENT DOCUMENTS 9,333,426 B1 * 5/2016 Bachman ........... G06Q 30/0251
2002/0184211 A1 * 12/2002 Gruenwald ......... G06F 16/2423
(Continued)

FOREIGN PATENT DOCUMENTS

| KR | 10-2015-0115073 A | 10/2015 |
| KR | 10-2016-0058798 A | 5/2016 |
| KR | 10-2018-0058598 A | 6/2018 |

*Primary Examiner* — Saba Dagnew
(74) *Attorney, Agent, or Firm* — Kilpatrick Townsend & Stockton LLP

(57) ABSTRACT

Provided is an operating method of an advertisement management device, the operating method including: based on log data of a plurality of users collected from a certain game, setting at least one group for the certain game; registering advertisement information to be provided to the at least one group; requesting a plurality of platform servers capable of providing advertisements to provide the advertisement information for each of the at least one group; obtaining, from the plurality of platform servers, feedback information of advertisements provided for each of the at least one group; and based on the feedback information, performing management of the advertisement information registered for each of the at least one group.

18 Claims, 13 Drawing Sheets

(51) Int. Cl.
*G06Q 30/0241* (2023.01)
*G06Q 30/0242* (2023.01)

(56) References Cited

U.S. PATENT DOCUMENTS

| | | | | |
|---|---|---|---|---|
| 2005/0086105 | A1* | 4/2005 | McFadden | G06Q 30/0244 |
| | | | | 705/14.43 |
| 2006/0168277 | A1* | 7/2006 | Godse | H04L 67/53 |
| | | | | 709/230 |
| 2009/0132559 | A1* | 5/2009 | Chamberlain | G06Q 30/02 |
| | | | | 707/999.102 |
| 2012/0101807 | A1* | 4/2012 | Heo | G06F 16/3331 |
| | | | | 704/9 |
| 2012/0142429 | A1* | 6/2012 | Muller | A63F 13/69 |
| | | | | 463/42 |
| 2012/0310753 | A1* | 12/2012 | Gaddis | G06Q 30/0641 |
| | | | | 705/14.73 |
| 2013/0262230 | A1* | 10/2013 | King | G06Q 30/02 |
| | | | | 705/14.54 |
| 2013/0285855 | A1* | 10/2013 | Dupray | G01S 5/0278 |
| | | | | 342/451 |
| 2014/0279420 | A1* | 9/2014 | Okerlund | G06Q 40/00 |
| | | | | 705/39 |
| 2015/0088663 | A1 | 3/2015 | Schechter et al. | |
| 2016/0063084 | A1* | 3/2016 | Han | G06F 16/24553 |
| | | | | 707/736 |
| 2016/0253694 | A1* | 9/2016 | Kozareva | G06Q 50/01 |
| | | | | 705/14.41 |
| 2017/0216727 | A1* | 8/2017 | Tsao | A63F 13/35 |
| 2018/0068350 | A1* | 3/2018 | Grosso | G06Q 30/0267 |
| 2019/0034976 | A1* | 1/2019 | Hamedi | G06Q 30/0243 |
| 2019/0205726 | A1* | 7/2019 | Khabiri | G06N 3/006 |

* cited by examiner

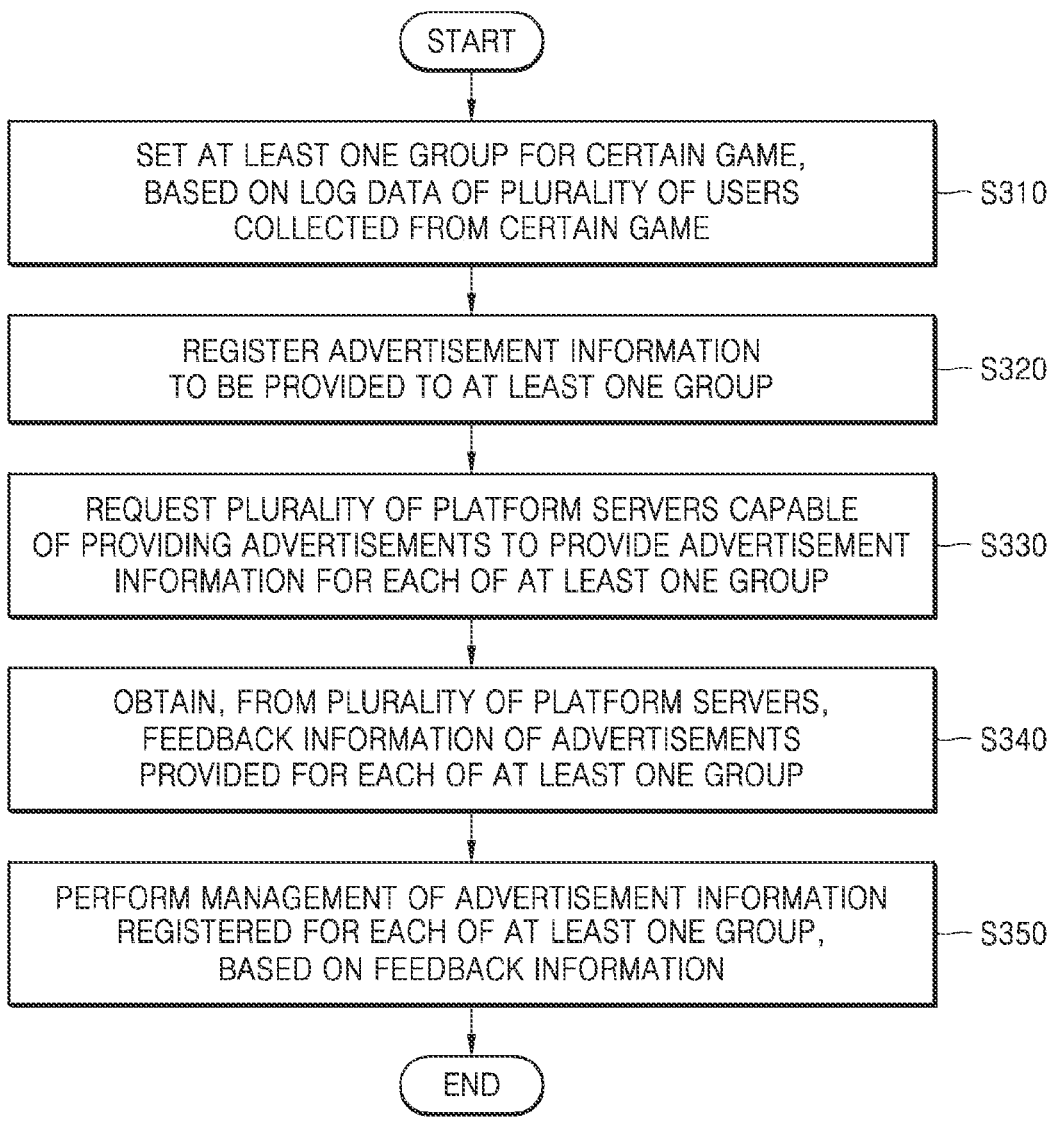

ADVERTISEMENT MANAGEMENT DEVICE MANAGING ADVERTISEMENT PROVIDED VIA PLATFORM SERVER AND OPERATION METHOD OF ADVERTISEMENT MANAGEMENT DEVICE

CROSS-REFERENCE TO RELATED APPLICATION

This application is based on and claims priority under 35 U.S.C. § 119 to Korean Patent Application No. 10-2019-0153771, filed on Nov. 26, 2019, in the Korean Intellectual Property Office, the disclosure of which is incorporated by reference herein in its entirety.

BACKGROUND

1. Field

The present disclosure relates to an advertisement management device managing an advertisement and an operating method of the advertisement management device.

2. Description of Related Art

Game companies or publishing companies provide users with advertisements related to a certain game. The users may participate in events included in the advertisements. However, the advertisements may become useless when the same advertisements are provided to all users.

There is a need for a technology for providing users of a certain game with appropriate advertisements and managing the advertisements more efficiently in order for the game companies and the publishing companies to increase profits from advertisements.

SUMMARY

The present disclosure is to provide a certain targeted advertisement to users in a group set for a certain game through a platform server.

Based on feedback information of advertisements provided through the platform server, an advertisement management device aims to efficiently manage the advertisements.

The advertisement management device aims to set advertisements, provide the advertisements, and manage the advertisements in an efficient manner with respect to a certain group within a certain game.

Additional aspects will be set forth in part in the description which follows and, in part, will be apparent from the description, or may be learned by practice of the presented embodiments of the disclosure.

According to an aspect, provided is an operating method of an advertisement management device, the operating method including: based on log data of a plurality of users collected from a certain game, setting at least one group for the certain game; registering advertisement information to be provided to the at least one group; requesting a plurality of platform servers capable of providing advertisements to provide the advertisement information for each of the at least one group; obtaining, from the plurality of platform servers, feedback information of advertisements provided for each of the at least one group; and based on the feedback information, performing management of the advertisement information registered for each of the at least one group.

According to another aspect, provided is a computer program stored in a medium to execute the operating method of the advertisement management device in combination with the advertisement management device.

According to another aspect, provided is a computer-readable recording medium having recorded thereon a program for executing the operating method of the advertisement management device on the advertisement management device.

According to an aspect, provided is an advertisement management device including: a communication device for performing communication with a plurality of platform servers that provide advertisements; a storage; a user interface device; a processor; and a memory for storing instructions executable by the processor, wherein the processor, by executing the instructions, is configured to, based on log data of a plurality of users collected from a certain game, set at least one group for the certain game, register advertisement information to be provided to the at least one group, request the plurality of platform servers to provide the advertisement information for each of the at least one group through the communication device, obtain, from the plurality of platform servers, feedback information of advertisements provided for each of the at least one group through the communication device, and based on the feedback information, perform management of the advertisement information registered for each one of the at least one group.

BRIEF DESCRIPTION OF THE DRAWINGS

The above and other aspects, features, and advantages of certain embodiments of the disclosure will be more apparent from the following description taken in conjunction with the accompanying drawings, in which:

The present disclosure may be easily understood through the following detailed description and the accompanying drawings, in which reference numerals refer to structural elements;

FIG. 3 is a flowchart of an operating method of an advertisement management device, according to an embodiment;

DETAILED DESCRIPTION

Figure 1:
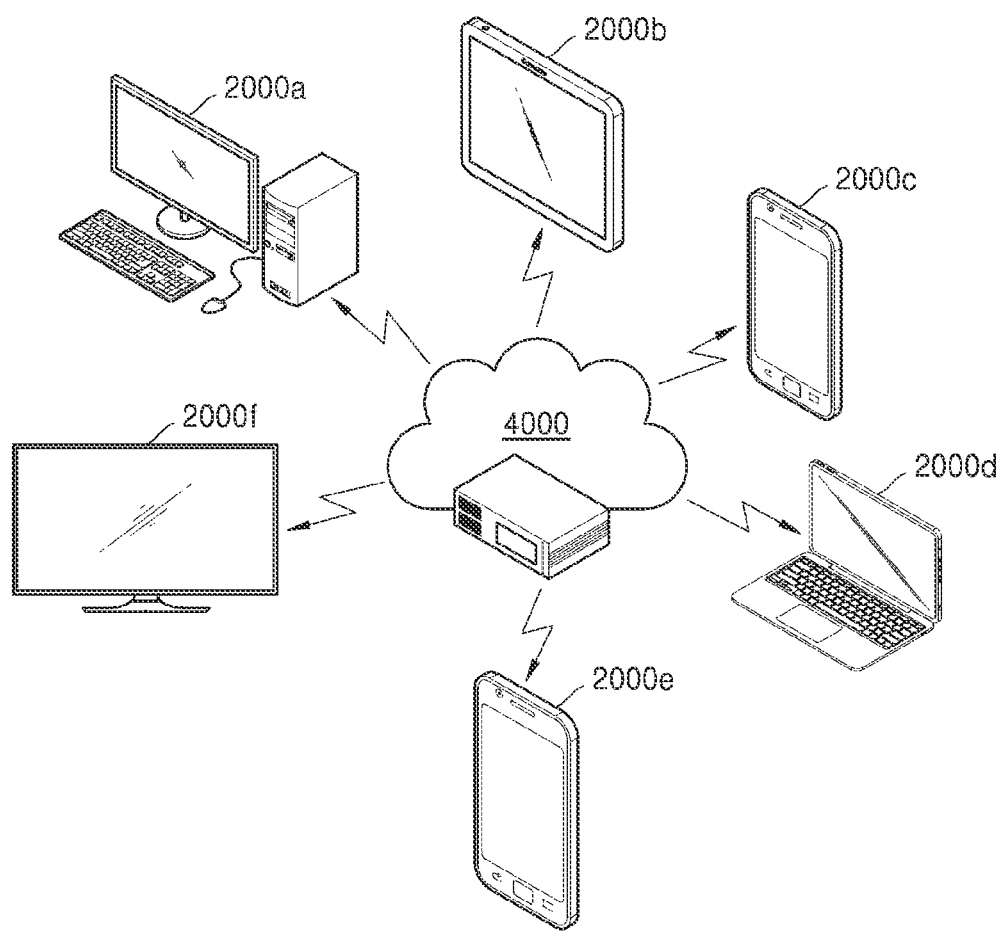
FIG. 1 illustrates an online game providing system including a server and a client, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments are described in detail with reference to the drawings. Embodiments described below may be modified and implemented in various forms. In order to more clearly describe the features of embodiments, detailed descriptions of matters widely known to those of ordinary skill in the art to which the following embodiments belong will be omitted.

In the specification, when a component "connects" or is "connected" to another component, the component is directly connected to the other component or is connected to the other component with one or more components therebetween. Also, in the specification, when a component "includes" another component, the other component may be further included, rather than excluding the existence of the other component, unless otherwise described.

Also, while the terms including ordinal numbers such as "first," "second," etc., used in the present specification, may be used to describe various components, such components must not be limited to the above terms. The above terms are used only to distinguish one component from another.

Throughout the specification, a "game server" may provide an electronic device of a user with a game service and may be used to manage the game service. Also, the "game server" may be embodied by a special-purpose computer, a general-purpose computer, a supercomputer, or a mainframe computer, but is not limited thereto.

Throughout the specification, an "advertisement management device" may set an advertisement targeted to users classified according to a certain criterion, provide the users with the advertisement through an external platform server, and manage the advertisement based on feedback information obtained from the platform server.

Throughout the specification, a "platform server" may be an external device of a game server and an advertisement management device and may provide a user with a certain service.

Throughout the specification, "log data" may include a record of a user's activities performed in a certain game. For example, the "log data" may include information or data about a time point at which a user logs in a certain game, purchasing of an item in the certain game by the user, an accumulated purchase amount, a user's play history in the certain game, a stage or quest achieved by the user in the certain game, a user's game level, or a time point at which the user logs out from the certain game.

Throughout the specification, "advertisement information" may be at least one of a name of an advertisement, a start date of the advertisement, an end date of the advertisement, and advertising cost.

Throughout the specification, "feedback information" may be information in which the behavior of a user is monitored in response to an advertisement being transmitted to the user from a platform server. For example, the feedback information may include at least one piece of information among the number of clicks on a certain advertisement provided by a certain platform server, the number of actions corresponding to the certain advertisement, the number of installations of an application of a certain game by the certain advertisement, and an advertising cost generated by the certain platform server.

Throughout the specification, "performance information" may be used to determine the efficiency of an advertisement for a certain game.

FIG. 1 illustrates an online game providing system including a server and a client, according to an embodiment.

According to an embodiment, the online game providing system may include a server 4000 and a plurality of clients 2000*a*, 2000*b*, 2000*c*, 2000*d*, 2000*e*, and 2000*f*. The server 4000 may provide a game to the plurality of clients 2000*a*, 2000*b*, 2000*c*, 2000*d*, 2000*e*, and 2000*f* by serving the game through a network.

FIG. 1 shows examples of the clients used by a user and illustrates the desktop computer 2000*a*, the tablet computer 2000*b*, the mobile phone 2000*c*, the laptop 2000*d*, the smart phone 2000*e*, and the television 2000*f*. However, the clients are not limited thereto and may include various electronic devices such as a personal digital assistant (PDA), a portable multimedia player (PMP), a navigation device, an MP3 player, a digital camera, a refrigerator, a washing machine, or a vacuum cleaner.

A game (for example, an online game) may be executed by the plurality of clients 2000*a*, 2000*b*, 2000*c*, 2000*d*, 2000*e*, and 2000*f*. In order to execute the game, a program, for example, an application, or a launcher may be installed on the clients 2000*a*, 2000*b*, 2000*c*, 2000*d*, 2000*e*, and 2000*f*, but is not limited thereto. Users may enjoy the game provided by the server 4000 by executing the program installed on the clients 2000*a*, 2000*b*, 2000*c*, 2000*d*, 2000*e*, and 2000*f*. Various embodiments of the present disclosure described below may be embodied in a program for executing a game, or may be embodied through a program separate from the program.

The server 4000 may be operated by a game provider, and the server 4000 may include a single server, a group of servers, and a cloud server, but is not limited thereto. The server 4000 may provide users with a game and may include a database for storing data of the users. In addition, the server 4000 may further include a payment server or a disbursement server that generates and processes a payment event. The payment server or the disbursement server may be a server separate from the server 4000 and may mediate payment or disbursement between the server 4000 and the clients 2000a, 2000b, 2000c, 2000d, 2000e, and 2000f. The server 4000 may further include a database (DB) server for storing and managing user data, and the DB server may be a server separate from the server 4000.

A program for serving a game may be driven in the server 4000. Various embodiments of the present disclosure described below may be embodied in the program for serving a game or may be embodied through a program separate from the program.

A network may refer to a connection established (or formed) using a certain communication method and may refer to a communication network connected through a certain communication means for transmitting data between the clients 2000a, 2000b, 2000c, 2000d, 2000e, and 2000f or between the clients 2000a, 2000b, 2000c, 2000d, 2000e, and 2000f and the server 4000.

The communication means includes communication through a certain communication standard, a certain frequency band, a certain protocol, or a certain channel, short-range communication, long-distance communication, wireless communication, and wired communication. For example, the communication means may include Bluetooth, Bluetooth low energy (BLE), wireless fidelity (Wi-Fi), Zigbee, 3rd generation (3G), long term evolution (LTE), or a communication means through ultrasound, but is not limited thereto.

A short-range communication means may refer to a communication means in which devices performing communication may communicate with each other only when the devices are within a certain range, and may include, for example, Bluetooth and near-field communication (NFC), but is not limited thereto.

A long-distance communication means may refer to a communication means in which devices performing communication may communicate with each other regardless of a distance. For example, the long-distance communication means may include a means in which two devices performing communication through a repeater such as an access point (AP) may communicate even when a distance between the two devices is greater than or equal to a certain distance, and may include a communication means using a cellular network (3G or LTE) used for text transmission and phone calls, but is not limited thereto.

In a process of the server 4000 serving an online game using a network, communication between the server 4000 and the clients 2000a, 2000b, 2000c, 2000d, 2000e, and 2000f may be performed through an arbitrary communication means.

The online game may include various genres of games such as a role playing game (RPG), a tabletop RPG (TRPG), a massively multiplayer online RPG (MMORPG), a multiplayer online battle arena (MOBA), an aeon of strife (AOS), a real time strategy (RTS), a first-person shooter (FPS), a trading card game (TCG), a collectible card game (CCG), a sports game, or a competition fight game, but is not limited thereto. The online game may be played as a match between users or a match between a user and a computer (e.g., artificial intelligence), but is not limited thereto and may be embodied in various forms.

The online game providing system illustrated in FIG. 1 may also function as an online platform providing system. Meanwhile, the server 4000 illustrated in FIG. 1 may correspond to a game server 20 described with respect to FIGS. 2 to 12.

Figure 2:
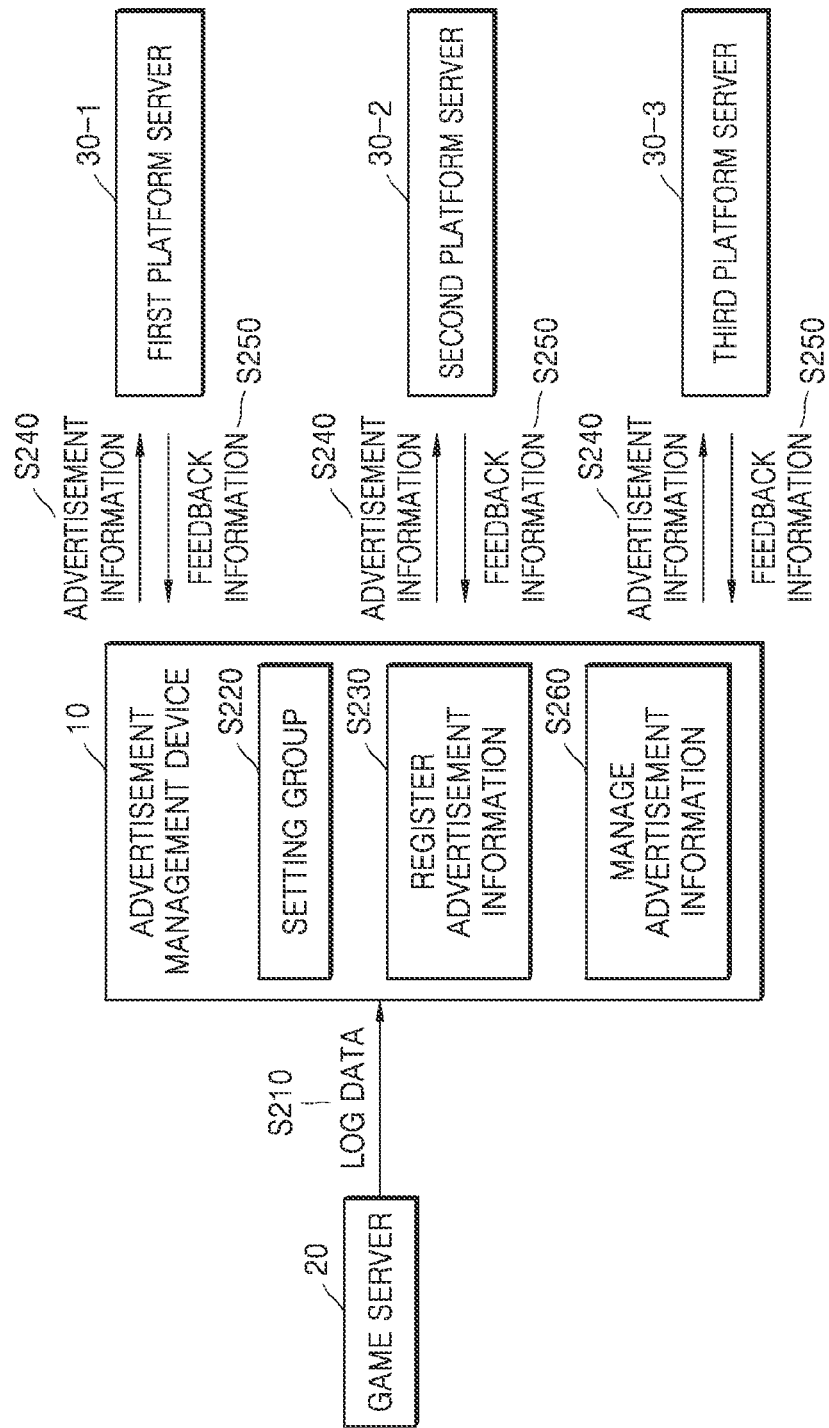
FIG. 2 is a conceptual diagram for describing a method, performed by an advertisement management device, of transmitting advertisement information to a platform server and managing the advertisement information according to feedback information received from the platform server, so that a certain advertisement is provided to users in a certain group, according to an embodiment.

FIG. 2 is a conceptual diagram for describing a method, performed by an advertisement management device 10, of transmitting advertisement information to a platform server and managing the advertisement information according to feedback information received from the platform server, so that a certain advertisement is provided to users in a certain group, according to an embodiment.

Referring to FIG. 2, in step S210, the advertisement management device 10 may receive, from the game server 20, log data of a plurality of users having a play history of a certain game.

In step S220, the advertisement management device 10 may set at least one group for the certain game, based on the log data of the plurality of users.

In step S230, the advertisement management device 10 may register advertisement information to be provided to the at least one group.

In step S240, the advertisement management device 10 may request a first platform server 30-1, a second platform server 30-2, and a third platform server 30-3 to provide the advertisement information registered for each of the at least one group.

In step S250, the advertisement management device 10 may receive feedback information of advertisements provided for each of the at least one group from the first platform server 30-1, the second platform server 30-2, and the third platform server 30-3.

In step S260, the advertisement management device 10 may perform management of the advertisement information registered for each of the at least one group, based on the feedback information.

FIG. 3 is a flowchart of an operating method of an advertisement management device, according to an embodiment.

Referring to FIG. 3, in step S310, the advertisement management device 10 may set at least one group for a certain game, based on log data of a plurality of users received from a certain game.

For example, the advertisement management device 10 may determine at least one parameter used for setting a group from among a user's access rate in the certain game, a user's access time in the certain game, an item purchased by a user and a purchase amount of the item in the certain game, and a user's game level and character in the certain game.

The advertisement management device 10 may obtain, from the log data of the plurality of users, a value of the at least one parameter for the plurality of users. The advertisement management device 10 may set the at least one group for the certain game, based on the value of the at least one parameter for the plurality of users. The plurality of users are classified into the at least one group according to a certain criterion, and thus, an advertisement targeted to each of the at least one group may be provided.

For example, the advertisement management device 10 may display a user interface receiving an input of information used to set the at least one group.

In step S320, the advertisement management device 10 may register advertisement information to be provided to the at least one group.

For example, the advertisement management device 10 may determine a first advertisement associated with an increase in activity of the certain game for users in a first group, based on log data of the users in the first group.

The advertisement management device 10 may register first advertisement information including the first advertisement and an execution condition of the first advertisement for the first group.

For example, the advertisement management device 10 may display a user interface receiving an input of information used to register an advertisement of the at least one group.

In step S330, the advertisement management device 10 may request a plurality of platform servers capable of providing advertisements to provide the advertisement information for each of the at least one group.

For example, the advertisement management device 10 may encrypt user information about the first group according to a first encryption method. The advertisement management device 10 may transmit, to the plurality of platform servers, the encrypted user information about the first group and the first advertisement information to be provided to the first group.

For example, the advertisement management device 10 may request the plurality of platform servers to provide users mapped with the first group of users with the first advertisement information, based on a result of comparing between the encrypted user information within a platform server according to the first encryption method and the encrypted user information about the first group.

By providing users belonging to each group with advertisements registered for each group through a platform server, an advertisement management device may provide an advertisement of a certain game to users through an external platform service other than an application or program of the certain game. Also, the advertisement management device may provide an advertisement targeted to the users belonging to each group through the platform server.

In step S340, the advertisement management device 10 may obtain, from the plurality of platform servers, feedback information of advertisements provided for each of the at least one group.

For example, the advertisement management device 10 may obtain, from the platform servers, the feedback information monitored by transmitting a certain advertisement to the users in the at least one group. The advertisement management device 10 may display the feedback information for each of the at least one group.

For example, the feedback information may include at least one piece of information among the number of clicks on a certain advertisement provided by a certain platform server, the number of actions corresponding to the certain advertisement, the number of installations of an application of a certain game by the certain advertisement, and an advertising cost generated by the certain platform server.

In step S350, the advertisement management device 10 may perform management of the advertisement information registered for each of the at least one group, based on the feedback information.

For example, the advertisement management device 10 may obtain performance information used to determine the efficiency of an advertisement for the certain game for each of the at least one group, based on log data of a user belonging to the at least one group, after the advertisement information being transmitted. The advertisement management device 10 may perform management of the advertisement information for each of the at least one group, based on the performance information.

For example, when a value of a first performance parameter for the first advertisement provided to the first group is less than a certain reference value, the advertisement management device 10 may interrupt the first advertisement or replace the first advertisement with a second advertisement.

As another example, when the value of the first performance parameter for the first advertisement provided to the first group is greater than the certain reference value, the advertisement management device 10 may maintain the first advertisement.

Figure 9:
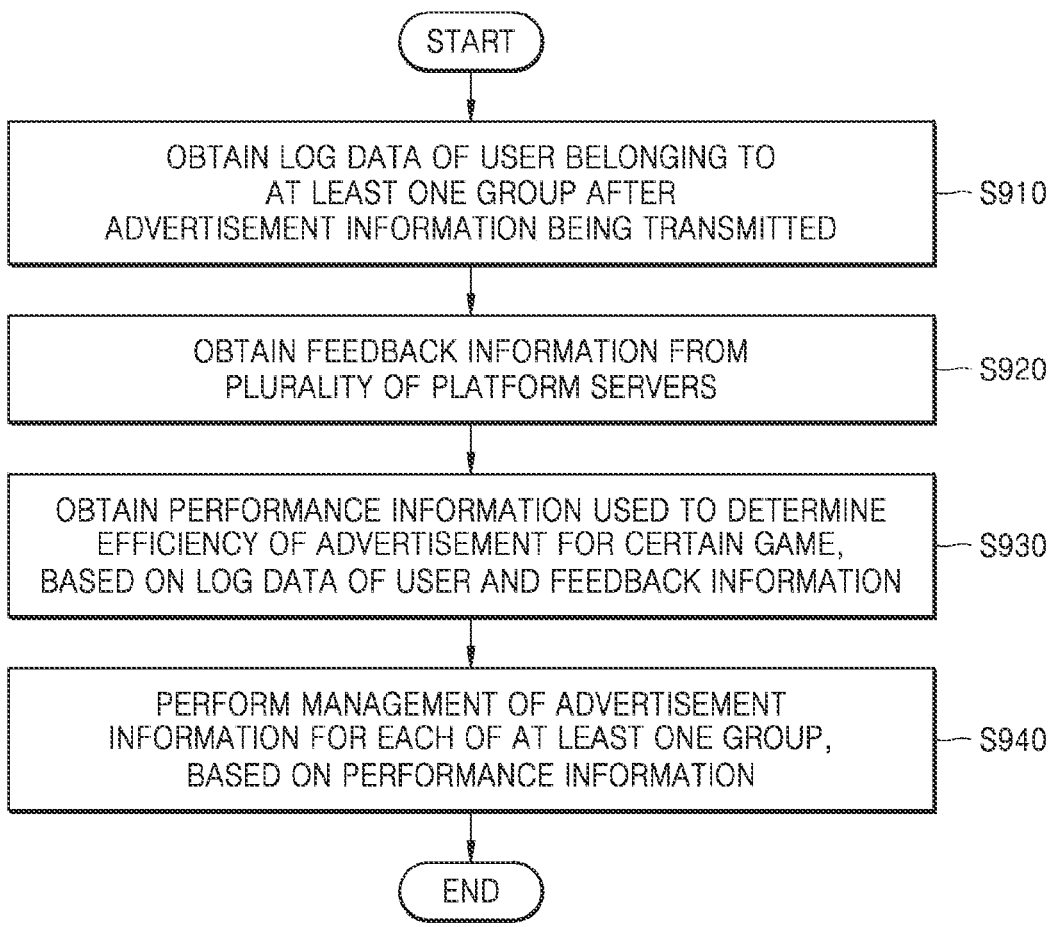
FIG. 9 is a flowchart of an operating method of managing, by an advertisement management device, advertisement information, based on performance information, according to an embodiment.
Figure 10:
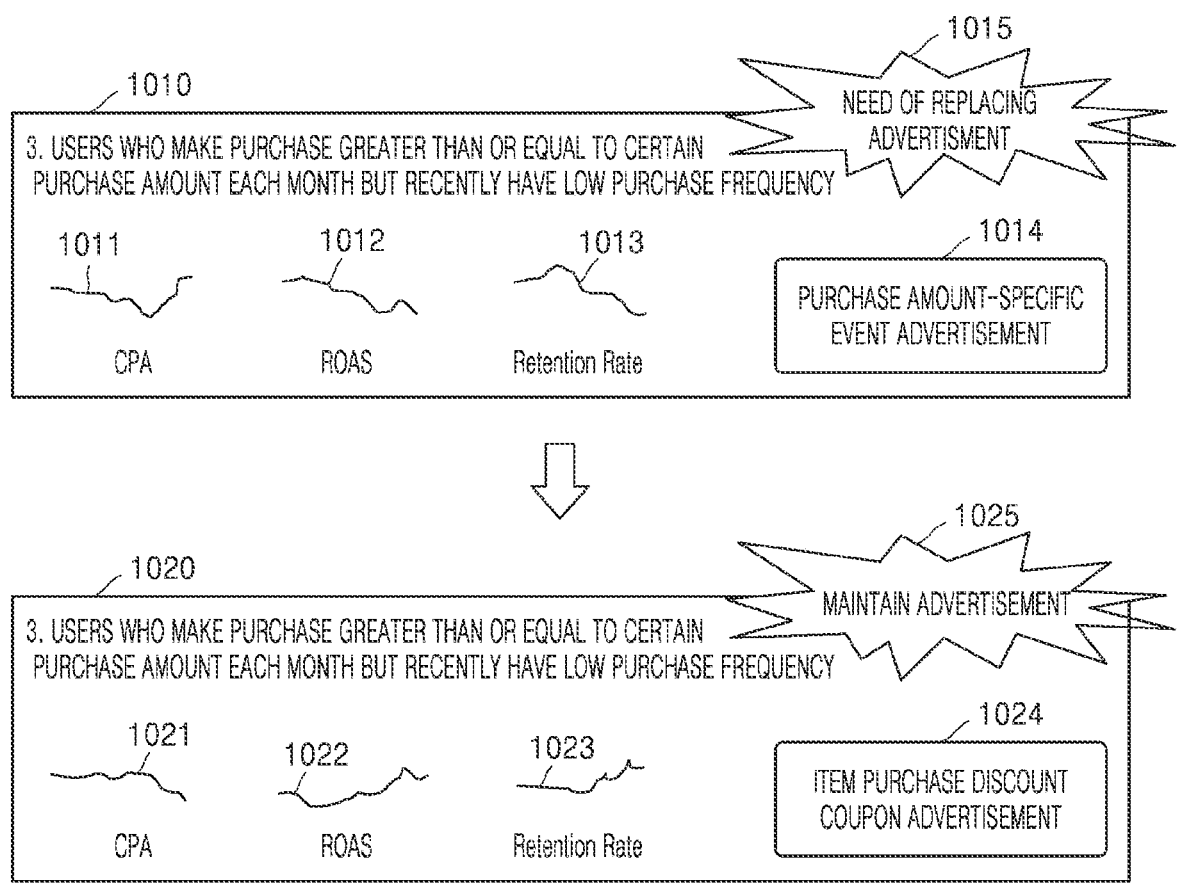
FIG. 10 is a diagram for describing an operation of managing, by an advertisement management device, advertisement information, based on performance information, according to an embodiment.

An operation of the advertisement management device 10 managing the advertisement information based on the performance information is described with respect to FIGS. 9 and 10.

The advertisement management device 10 may provide users in a group set for a certain game with a certain targeted advertisement through a platform server.

Also, the advertisement management device 10 may increase the efficiency of the advertisement by performing advertisement management based on feedback information of the advertisement provided through the platform server. That is, an advertising cost may be reduced by interrupting or replacing an advertisement with low advertising efficiency. Also, the performance relative to the advertising cost may be improved by continuously maintaining an advertisement with high advertising efficiency.

Accordingly, the advertisement management device 10 may set advertisements, provide the advertisements, and manage the advertisements in an efficient manner with respect to a certain group in a certain game.

Figure 4A:
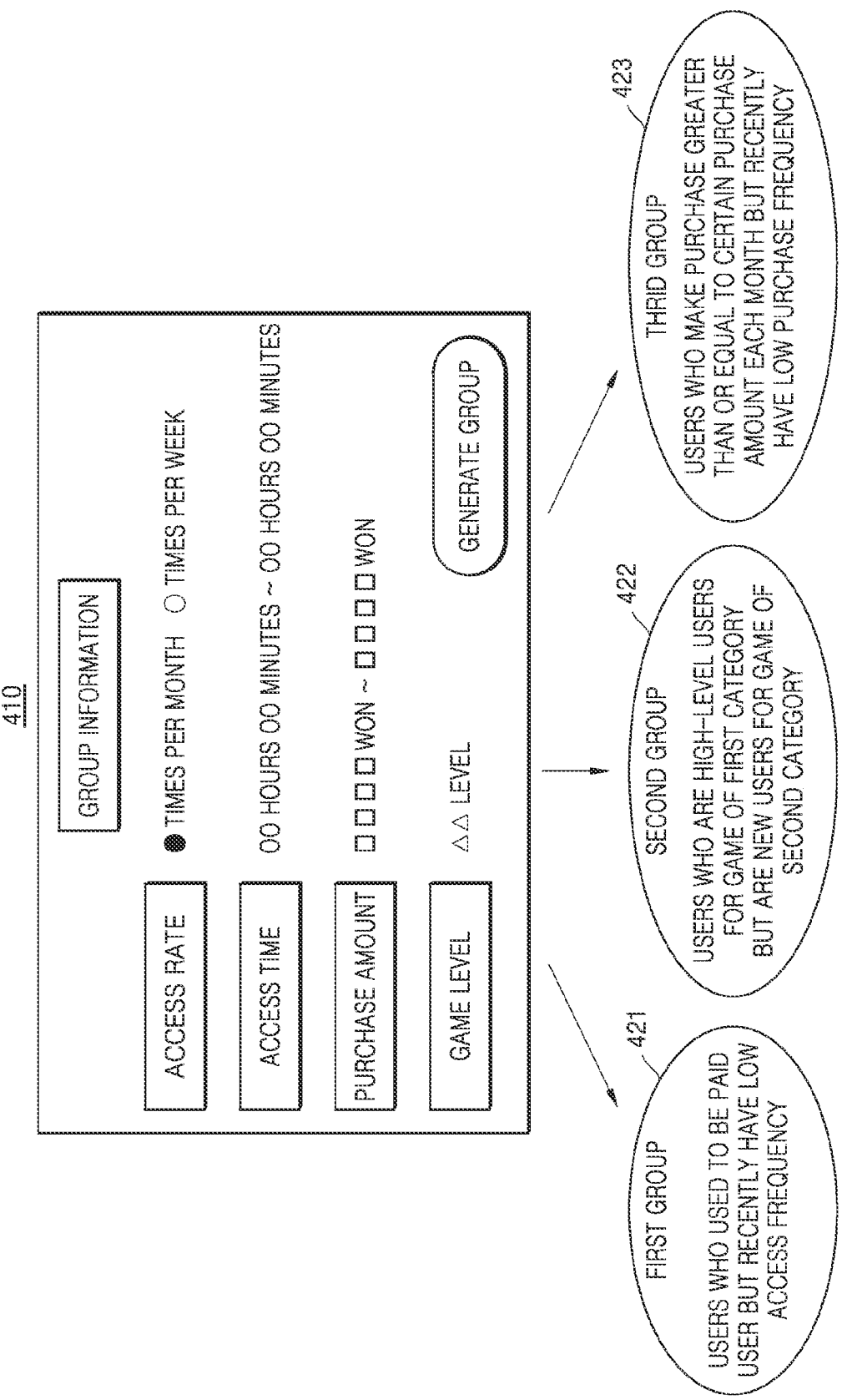
FIG. 4A is a diagram for describing a process of setting, by an advertisement management device, a group according to a certain parameter for a certain game, according to an embodiment.

FIG. 4A is a diagram for describing a process of setting, by an advertisement management device, a group according to a certain parameter for a certain game, according to an embodiment.

Referring to an image 410 of FIG. 4A, the advertisement management device 10 may display a user interface receiving an input of information used to set at least one group.

The advertisement management device 10 may receive an input of selecting a parameter used for setting a certain group. For example, the advertisement management device 10 may receive an input of selecting at least one parameter among a user's access rate in the certain game, a user's access time in the certain game, an item purchased by a user and a purchase amount of the item in the certain game, and a user's game level and character in the certain game. Here, the parameter is not limited to the parameter described above.

As illustrated in the image 410 of FIG. 4A, the advertisement management device 10 may receive an input for selecting an access rate, an access time, a purchase amount, and a game level. The advertisement management device 10 may receive an input of detailed setting information about parameters of the selected access rate, the selected access time, the selected purchase amount, and the selected game level. For example, in the "access rate" parameter, whether the number of accesses to the certain game is greater than or equal to a certain number or less than a certain number on a monthly or week basis may be set. Here, the "number of accesses" may be set in a range. Also, in the "access time" parameter, a time range in which the certain game is continuously logged in may be set. Also, in the "purchase amount" parameter, a range of the purchase amount of the item purchased by the user in the certain game may be set.

Also, in the "game level" parameter, a level range of the user of the certain game may be set.

Also, the advertisement management device 10 may receive, from log data, an input of setting a search period for searching conditions for the aforementioned parameters. The advertisement management device 10 may extract users satisfying a setting condition of a parameter from log data of a plurality of users within the search period and may generate a certain group including the extracted users.

Also, the advertisement management device 10 may extract users satisfying a setting condition of a parameter from log data for one game or a plurality of games and may generate a certain group including the extracted users.

Also, the advertisement management device 10 may receive an input of setting at least two search periods. When the at least two search periods are set, the advertisement management device 10 may extract users satisfying a setting condition of a parameter and generate a certain group including the extracted users, based on a result of comparing log data of a first search period with log data of a second search period.

For example, a manager may set a setting condition of a first group 421 in order to set, as the first group 421, a user who used to be a paid user but recently has a low access frequency. As the setting condition of the first group 421, an entire search period may be set to be within one year, a search period with low access frequency may be set to be within three months, an access rate may be set to be less than four times a month, and a purchase amount may be set to be in a range of 10,000 won to 30,000 won per month. When the setting condition of the first group 421 is set in the advertisement management device 10, the advertisement management device 10 may generate the first group 421 satisfying the setting condition of the first group 421, based on log data of a plurality of users within three months.

As another example, the manager may set a setting condition of a second group 422 in order to set, as the second group 422, a user who is a high-level user for a game of a first category but is a new user for a game of a second category. As the setting condition of the second group 422, a search period may be set to be within two months, an access rate for the game of the second category may be set to be less than three times a week, a game level of a user for the game of the first category may be set to be a level within the top 10%, and a game level of the user for the game of the second category may be set to be a level within the bottom 10%. When the setting condition of the second group 422 is set in the advertisement management device 10, the advertisement management device 10 may generate the second group 422 satisfying the setting condition of the second group 422, based on log data of a plurality of users within two months.

As another example, the manager may set a setting condition of a third group 423 in order to set, as the third group 423, a user who makes a purchase greater than or equal to a certain purchase amount each month but recently has a low purchase frequency. As the setting condition of the third group 423, an entire search period may be set to be within six months, a search period with low purchase frequency with respect to the entire search period may be set to be within three months from present, a purchase amount may be set to be less than 10,000 won per month, and the number of purchases may be set to be less than three times a month. When the setting condition of the third group 423 is set in the advertisement management device 10, the advertisement management device 10 may generate the third group 423 satisfying the setting condition of the third group 423, based on log data of a plurality of users within six months.

Figure 4B:
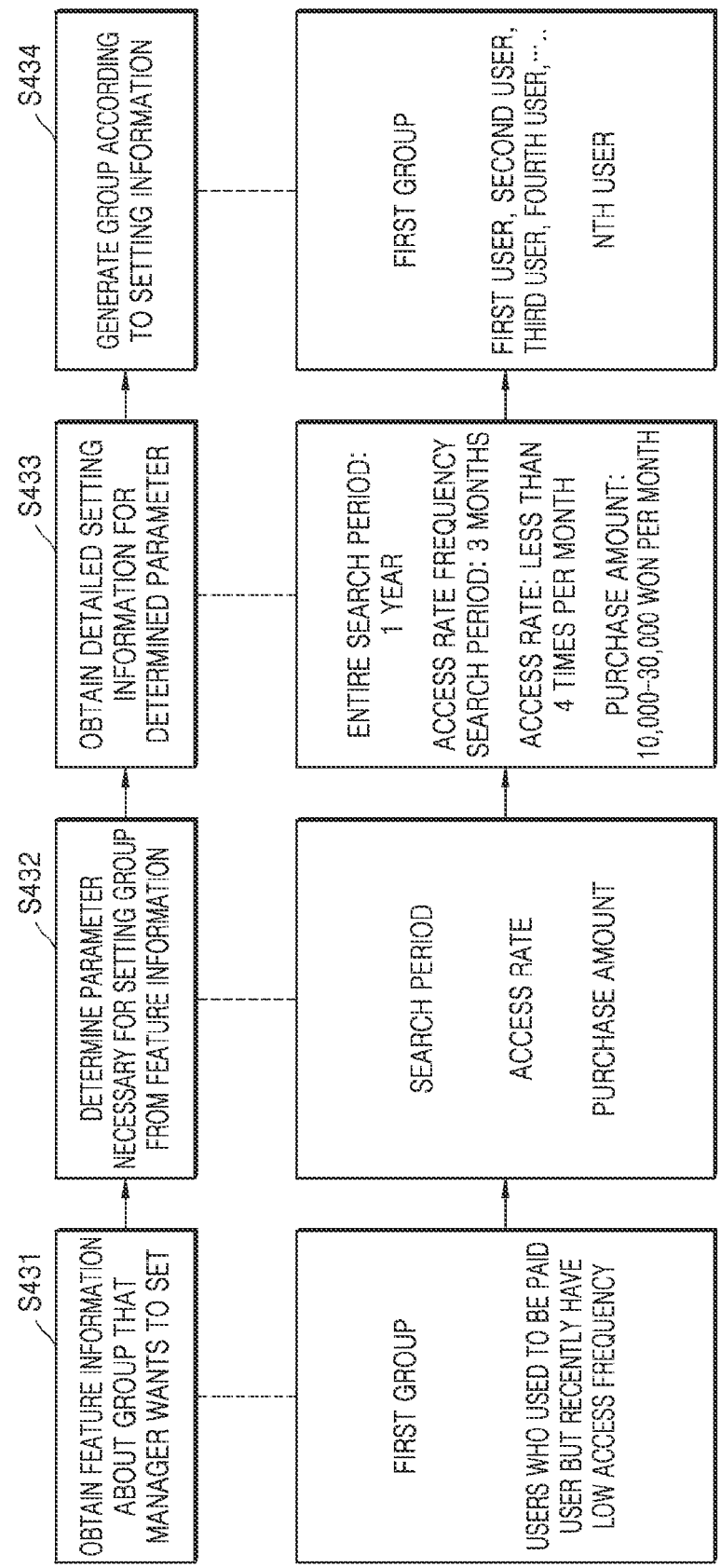
FIG. 4B is a diagram for describing a process of setting, by an advertisement management device, a group according to a certain parameter for a certain game, according to another embodiment.

FIG. 4B is a diagram for describing a process of setting, by an advertisement management device 10, a group according to a certain parameter for a certain game, according to another embodiment.

Referring to FIG. 4B, in step S431, the advertisement management device 10 may obtain feature information about a group that the manager wants to set. For example, the manager may input feature information about the first group through a user interface device of the advertisement management device 10. The advertisement management device 10 may receive an input phrase in which "a user who used to be a paid user but recently has a low access frequency" is input.

In step S432, the advertisement management device 10 may determine, from the feature information, a parameter necessary for setting a group. For example, the advertisement management device 10 may determine a parameter necessary for extracting the first group of users from a plurality of users. The advertisement management device 10 may determine, as a parameter, "a search period," "an access rate," and "a purchase amount."

In step S433, the advertisement management device 10 may obtain detailed setting information for the determined parameter. Here, the detailed setting information may be automatically set by the advertisement management device 10 or may be set by the manager. For example, the advertisement management device 10 may obtain, as the detailed setting information, setting conditions in which an entire search period is within one year, an access rate frequency search period is within three months, an access rate is less than four times a month, and a purchase amount is in a range of 10,000 won to 30,000 won per month.

In step S434, the advertisement management device 10 may extract users satisfying a setting condition of a parameter from log data of a plurality of users within the search period and may generate a certain group including the extracted users. For example, the advertisement management device 10 may generate the first group based on the setting condition of the first group.

Figure 5:
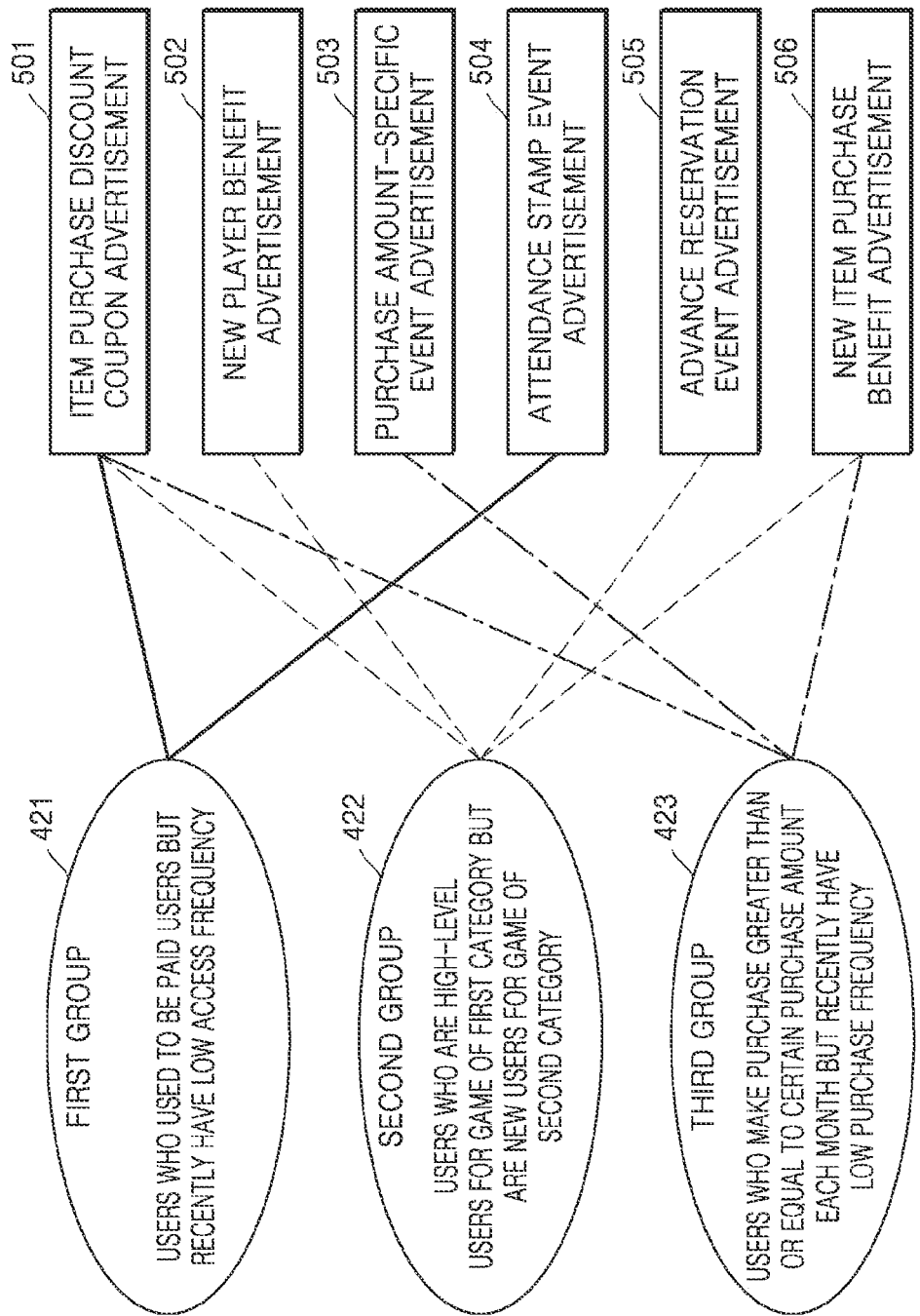
FIG. 5 is a diagram for describing a process of determining, by an advertisement management device, advertisement information to be provided to a group, according to an embodiment.

FIG. 5 is a diagram for describing a process of determining, by an advertisement management device, advertisement information to be provided to a group, according to an embodiment.

Referring to FIG. 5, the advertisement management device 10 may determine a certain advertisement associated with an increase in activity of a certain game for users in a certain group, based on log data of the users in the certain group. The advertisement management device 10 may register advertisement information including the certain advertisement and an execution condition of the certain advertisement for the certain group.

For example, when users who used to be paid users but recently have a low access frequency are set as the first group 421, the advertisement management device 10 may determine an advertisement for increasing the access frequency of the users in the first group 421. For example, the advertisement management device 10 may determine an item purchase discount coupon advertisement 501 and an attendance stamp event advertisement 504 as advertisements to be provided to the first group 421 of users, and may register advertisement information. By providing the first group 421 of users with the certain advertisements (for example, the item purchase discount coupon advertisement 501 and the attendance stamp event advertisement 504), the access frequency of the first group 421 of users may be increased.

As another example, when users who are high-level users for the game of the first category but are new users for the game of the second category are set as the second group 422, the advertisement management device 10 may determine an advertisement for increasing a participation level of the users in the second group 422 with respect to the game of the second category or improving a game level of the game of the second category. For example, the advertisement management device 10 may determine the item purchase discount coupon advertisement 501, a new player benefit advertisement 502, an advance reservation event advertisement 505, and a new item purchase benefit advertisement 506 as advertisements to be provided to the users in the second group 422, and may register advertisement information. By providing the users in the second group 422 with the certain advertisements (for example, the item purchase discount coupon advertisement 501, the new player benefit advertisement 502, the advance reservation event advertisement 505, and the new item purchase benefit advertisement 506), the users in the second group 422 may adapt to the game of the second category.

As another example, when users who make a purchase greater than or equal to a certain purchase amount each month but recently have a low purchase frequency are set as the third group 423, the advertisement management device 10 may determine an advertisement for increasing the purchase frequency of the users in the third group 423. For example, the advertisement management device 10 may determine the item purchase discount coupon advertisement 501, a purchase amount-specific event advertisement 503, and the new item purchase benefit advertisement 506 as the advertisements to be provided to the users in the third group 423, and may register advertisement information. By providing the users in the third group 423 with the certain advertisements (for example, the item purchase discount coupon advertisement 501, the purchase amount-specific event advertisement 503, and the new item purchase benefit advertisement 506), game activities of the users in the third group 423 may be increased.

Figure 6:
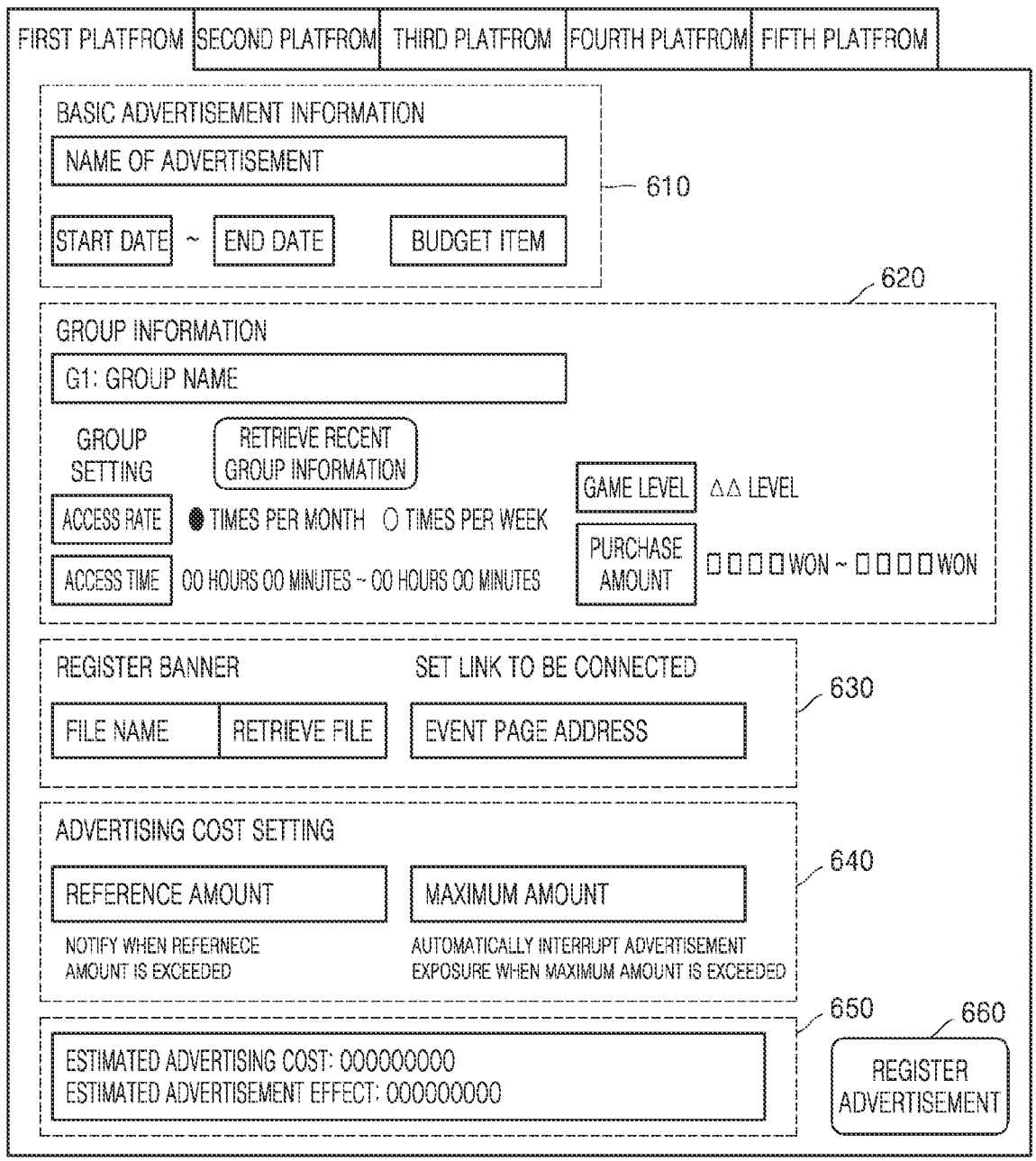
FIG. 6 is a diagram for describing a user interface used to register advertisement information to be provided to a certain group in an advertisement management device, according to an embodiment.

FIG. 6 is a diagram for describing a user interface used to register advertisement information to be provided to a certain group in an advertisement management device, according to an embodiment.

Referring to FIG. 6, the advertisement management device 10 may display the user interface for receiving an input of information used to set at least one group or register an advertisement of the at least one group.

For example, referring to a block 610 of FIG. 6, the user interface may include an input field for setting basic advertisement information. In the input field, a name of an advertisement, a start date and end date of the advertisement, and a budget item may be input.

For example, referring to a block 620 of FIG. 6, the user interface may include an input field for setting information of a group to be provided with an advertisement. In the input field, information on a name of the group may be input. Also, in the input field, information on a condition of a certain parameter necessary for setting a group may be input. Also, an icon of "retrieve recent group information" may be provided in the user interface.

For example, referring to a block 630 of FIG. 6, the user interface may include an input field for registering advertisement information. The manager may select "retrieve file," and may register an advertisement file stored in the advertisement management device 10 as a banner. Also, when the banner is selected by a user in the group, the manager may register address information linking to an event page. Meanwhile, a plurality of banner advertisements may be registered, and a plurality of pieces of address information linking to event pages may be registered. When there are a plurality of registered advertisements, the manager may set priorities with respect to the plurality of advertisements and may allow banner advertisements provided to users to be displayed according to the priorities in a platform server.

For example, referring to a block 640 of FIG. 6, the user interface may include an input field for setting advertising cost. In the input field, information for setting a reference amount of the advertising cost and a maximum amount of the advertising cost may be input. For example, when the advertising cost is greater than the reference amount, the advertisement management device 10 may display a notification for notifying that the reference amount is exceeded. Also, when the advertising cost is greater than the maximum amount, the advertisement management device 10 may request the platform server to interrupt the advertisement.

For example, referring to a block 650 of FIG. 6, the user interface may include an input field for inputting an estimated advertising cost and an estimated advertisement effect. The estimated advertising cost and the estimated advertisement effect may be input by the manager. Also, as the estimated advertising cost and the estimated advertisement effect, information predicted in the advertisement management device 10 may be input.

When all information used to set at least one group or register an advertisement of the at least one group is input in the advertisement management device 10, the manager may select an icon of "register advertisement" 660. When the advertisement management device 10 receives an input of selecting the icon of "register advertisement" 660, the advertisement management device 10 may register the advertisement to be provided to users in a certain group in a first platform.

The manager may set advertisement information in a second platform, a third platform, a fourth platform, and a fifth platform in the same manner as the advertisement information set in the first platform. Also, the manager may set different groups or different advertisement information for each platform.

Figure 7:
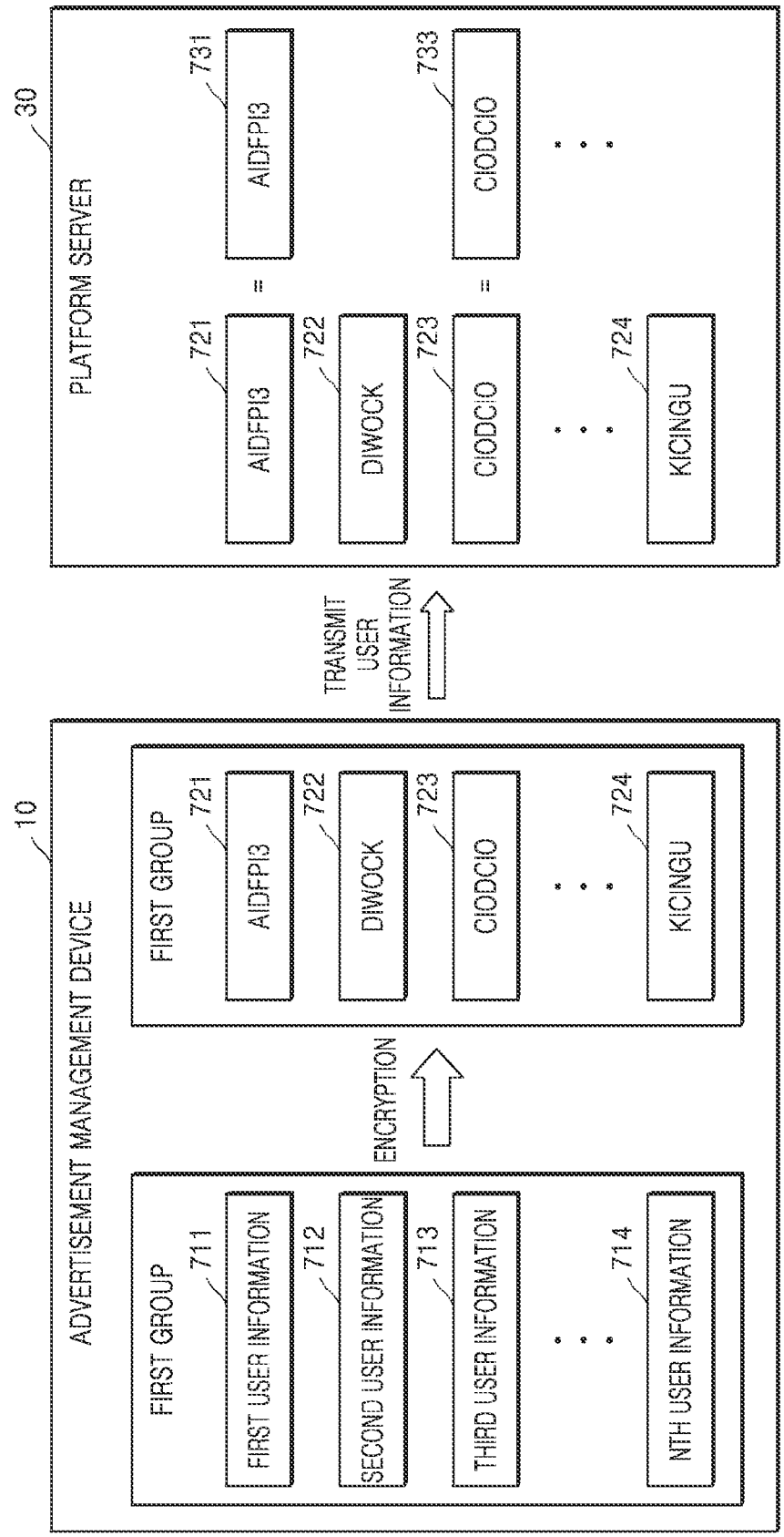
FIG. 7 is a diagram for describing a process of encrypting, by an advertisement management device, user information about a certain group to transmit the encrypted user information to a platform server, according to an embodiment.

FIG. 7 is a diagram for describing a process of encrypting, by an advertisement management device, user information about a certain group to transmit the encrypted user information to a platform server, according to an embodiment.

Referring to FIG. 7, the advertisement management device 10 may encrypt user information about the first group according to a first encryption method. For example, the first encryption method may be a one-way encryption method that is output as a character string having a certain length when a certain condition or data is encrypted. The first encryption method is not limited to the example described above. For example, the user information may include information about a user's name, a user's ID in a certain game, or the like.

For example, the advertisement management device 10 may encrypt first user information 711, second user information 712, third user information 713, . . . , and nth user information 714 within a list of users in the first group according to the first encryption method, and may obtain encrypted first user information 721, encrypted second user information 722, encrypted third user information 723, . . . , and nth user information 724.

The advertisement management device 10 may transmit, to a platform server 30, encrypted user information about the first group and first advertisement information to be provided to the first group of users.

The advertisement management device 10 may request the platform server 30 to provide users mapped with the first group of users with the first advertisement information, based on a result of comparing the encrypted user information in the platform server 30 according to the first encryption method with the encrypted user information about the first group.

For example, the platform server 30 may encrypt user information about users managed by the platform server 30 according to the first encryption method. The platform server 30 may extract users mapped with the first group of users from among the users managed by the platform server 30, by comparing the encrypted user information according to the first encryption method and the encrypted user information about the first group.

As shown in FIG. 7, the platform server 30 may obtain encrypted user information 731 corresponding to the encrypted first user information 721 and may obtain encrypted user information 733 corresponding to the encrypted third user information 723. The platform server 30 may provide the first advertisement information to a first user corresponding to the encrypted user information 731 and a third user corresponding to the encrypted user information 733.

Figure 8:
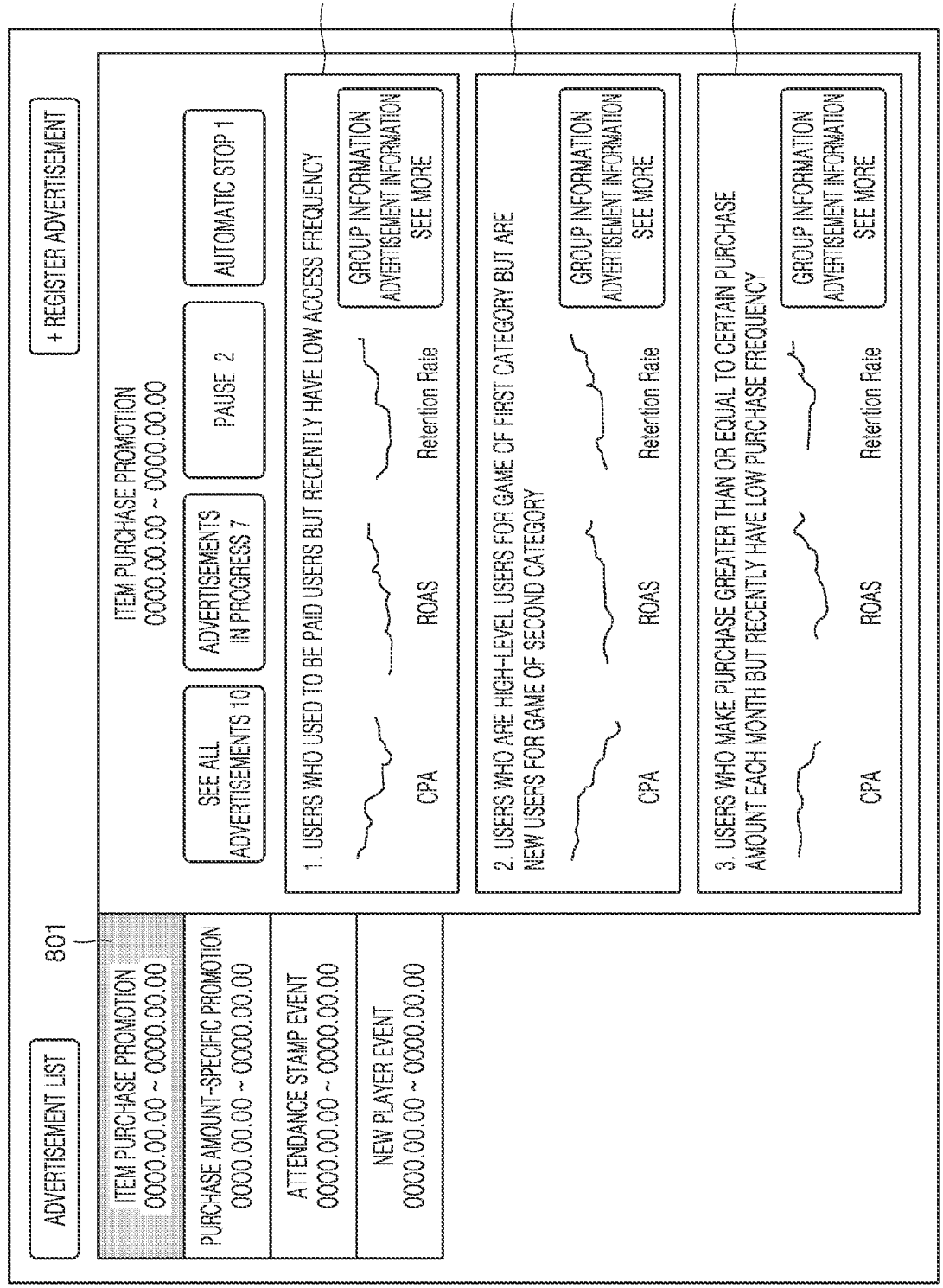
FIG. 8 is a diagram for describing a user interface for displaying an advertisement list managed by an advertisement management device and group-specific performance information regarding a certain advertisement, according to an embodiment.

FIG. 8 is a diagram for describing a user interface for displaying an advertisement list managed by an advertisement management device and group-specific performance information regarding a certain advertisement, according to an embodiment.

Referring to FIG. 8, the advertisement management device 10 may display the advertisement list being transmitted through a plurality of platform servers. The advertisement management device 10 may receive, from the advertisement list, an input of selecting an item purchase promotion 801. When the input of selecting the item purchase promotion 801 is received from the advertisement list, the advertisement management device 10 may display group-specific performance information regarding the item purchase promotion 801.

For example, the advertisement management device 10 may obtain, from the plurality of platform servers, feedback information of an advertisement provided as the item purchase promotion 801 to a user in each group. Here, the feedback information may be information in which the behavior of a user is monitored in response to an advertisement being transmitted to the user from a platform server. For example, the feedback information may include at least one piece of information among the number of clicking a certain advertisement provided by a certain platform server, the number of actions corresponding to the certain advertisement, the number of installing an application of a certain game by the certain advertisement, and an advertising cost generated by the certain platform server. The advertisement management device 10 may display the feedback information for each of the at least one group.

Also, advertising cost information may be represented by cost per click (CPC) indicating an advertising cost according to the number of clicks on a certain advertisement provided by a certain platform server, cost per action (CPA) indicating an advertising cost according to the number of certain actions corresponding to the certain advertisement, and cost per install (CPI) indicating an advertising cost according to the number of installations of an application of a certain game by the certain advertisement.

Also, the advertisement management device 10 may obtain performance information used to determine the efficiency of an advertisement for a certain game for each of at least one group, based on log data of a plurality of users and feedback information. The advertisement management device 10 may display the performance information. For example, the performance information may be expressed as a performance parameter. For example, the performance parameter may be return on ad spend (ROAS) indicating performance relative to an advertising cost. Also, the performance parameter may be return on investment (ROI) indicating performance relative to a total investment cost. Also, the performance parameter may be a key performance indicator (KPI). Also, the performance parameter may be a retention rate indicating a percentage of users who still remain as the users after a specific time point. The performance parameter is not limited to the above examples and may include other parameters.

Also, the advertisement management device 10 may display information about all advertisements, advertisements in progress, advertisements in pause, and advertisements for which automatic stop is set, with respect to the item purchase promotion 801.

For example, referring to a block 810 of FIG. 8, the advertisement management device 10 may display feedback information and performance information of the item purchase promotion with respect to the first group including "users who used to be paid users but recently have a low access frequency."

For example, referring to a block 820 of FIG. 8, the advertisement management device 10 may display feedback information and performance information of the item purchase promotion with respect to the second group including "users who are high-level users for the game of the first category but are new users for the game of the second category."

For example, referring to a block 830 of FIG. 8, the advertisement management device 10 may display feedback information and performance information of the item purchase promotion with respect to the third group including "users who make a purchase greater than or equal to a certain purchase amount each month but recently have a low purchase frequency."

FIG. 9 is a flowchart of an operating method of managing, by an advertisement management device, advertisement information, based on performance information, according to an embodiment.

Referring to FIG. 9, in step S910, the advertisement management device 10 may obtain log data of a user belonging to at least one group from a game server after the advertisement information is transmitted.

In step S920, the advertisement management device 10 may obtain, from a plurality of platform servers, feedback information of an advertisement for each group. For example, the feedback information may include at least one piece of information among the number of clicks on a certain advertisement provided by a certain platform server, the number of actions corresponding to the certain advertisement, the number of installations of an application of a certain game by the certain advertisement, and an advertising cost generated by the certain platform server. Here, the actions corresponding to the certain advertisement may include executing a certain game, purchasing an item in the certain game, registering as a member of the certain game, writing on a bulletin board of a certain game, or the like.

In step S930, the advertisement management device 10 may obtain performance information used to determine the efficiency of an advertisement for a certain game, based on the log data of the user and the feedback information.

For example, the advertisement management device 10 may receive advertising cost information (for example, CPC, CPA, CPI, etc.) for the certain game from a platform server. The advertisement management device 10 may obtain information of a certain parameter for the certain game for each group, based on log data of a user belonging to a group. The certain parameter may include a user's accumulated purchase amount, an access rate, a retention rate, or the like. The advertisement management device 10 may obtain performance information indicating the efficiency of an advertisement, by calculating a ratio of the certain parameter relative to an advertising cost.

In step S940, the advertisement management device 10 may perform management of the advertisement information for each of the at least one group, based on the performance information.

For example, when a value of a first performance parameter for a first advertisement provided to a first group is less than a certain reference value, the advertisement management device 10 may interrupt the first advertisement or replace the first advertisement with a second advertisement.

As another example, when the value of the first performance parameter for the first advertisement provided to the first group is greater than the certain reference value, the advertisement management device 10 may maintain the first advertisement.

FIG. 10 is a diagram for describing an operation of managing, by an advertisement management device, advertisement information, based on performance information, according to an embodiment.

Referring to an image 1010 of FIG. 10, the advertisement management device 10 may obtain feedback information 1011 and performance information 1012 and 1013 (also referred to as ROAS information 1012 and retention rate information 1013, respectively) of a purchase amount-specific event advertisement 1014 for a third group including "users who make a purchase greater than or equal to a certain purchase amount each month but recently have a low purchase frequency," and may display the feedback information 1011 and the performance information 1012 and 1013.

The advertisement management device 10 may determine whether to continuously maintain the purchase amount-specific event advertisement 1014, based on the performance information 1012 and 1013. The advertisement management device 10 may determine that performance relative to an advertising cost is on the decline, based on the ROAS information 1012 indicating performance relative to an advertising cost. Also, the advertisement management device 10 may determine that a retention rate is on the decline over time, based on the retention rate information 1013. The advertisement management device 10 may display a message 1015 notifying that the purchase amount-specific event advertisement 1014 should be replaced. As shown in an image 1020 of FIG. 10, the advertisement management device 10 may replace the purchase amount-specific event advertisement 1014 with an item purchase discount coupon advertisement 1024.

That is, when a certain performance parameter is less than a certain reference value, the advertisement management device 10 may interrupt an advertisement being currently transmitted through a platform server or replace the advertisement with another advertisement.

Referring to an image 1020 of FIG. 10, the advertisement management device 10 may obtain feedback information 1021 and performance information 1022 and 1023 (also referred to as ROAS information 1022 and retention rate information 1023, respectively) of the item purchase discount coupon advertisement 1024 for a third group including "users who make a purchase greater than or equal to a certain purchase amount each month but recently have a low purchase frequency," and may display the feedback information 1021 and the performance information 1022 and 1023.

The advertisement management device 10 may determine whether to continuously maintain the item purchase discount coupon advertisement 1024, based on the performance information 1022 and 1023. The advertisement management device 10 may determine that performance relative to an advertising cost is on the increase, based on the ROAS information 1022 indicating performance relative to an advertising cost. Also, the advertisement management device 10 may determine that a retention rate is on the increase over time, based on the retention rate information 1023. The advertisement management device 10 may display a message 1025 notifying that the item purchase discount coupon advertisement 1024 is maintained.

That is, when a certain performance parameter is greater than a certain reference value, the advertisement management device 10 may maintain an advertisement being currently transmitted through a platform server.

Figure 11:
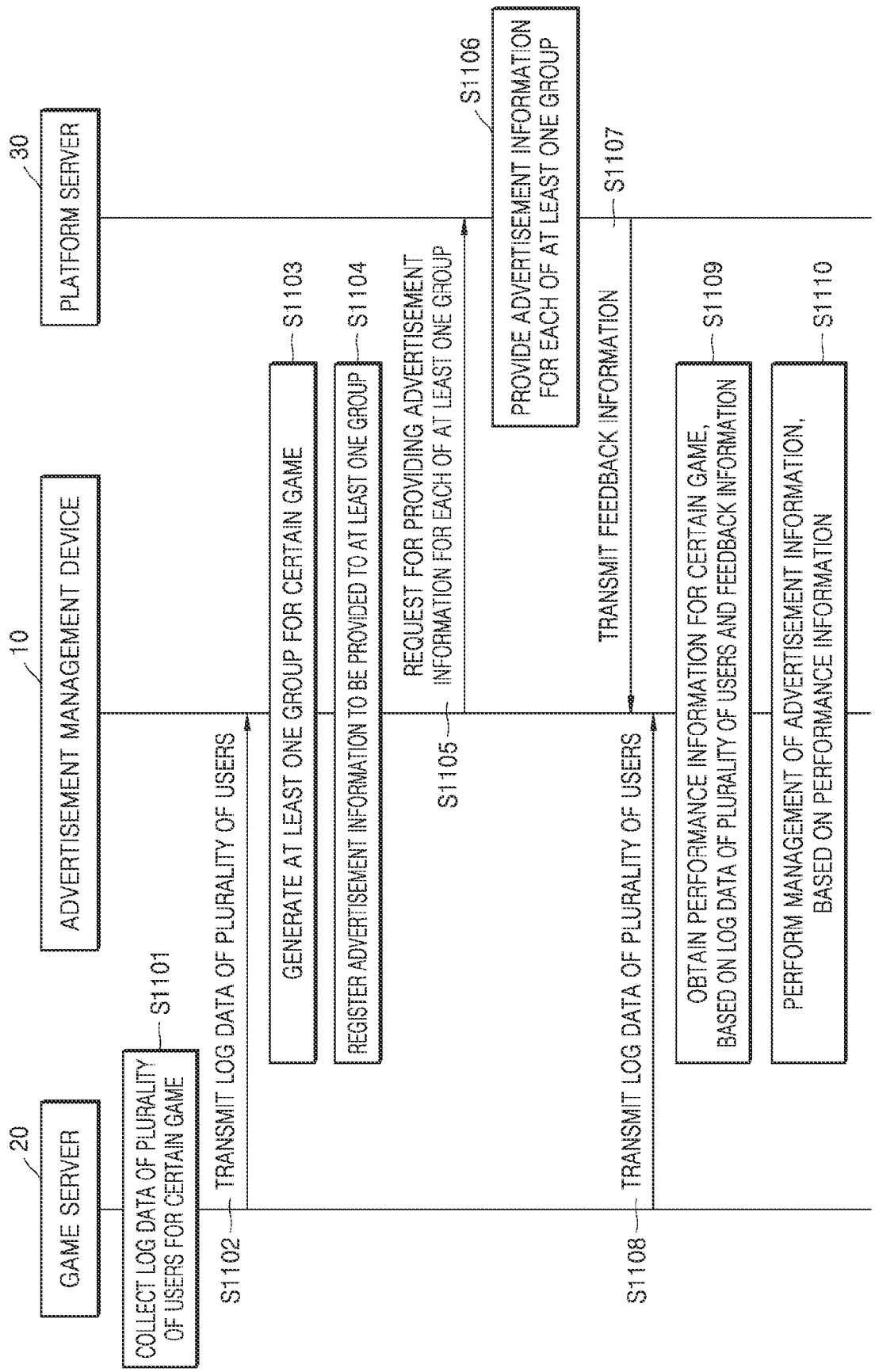
FIG. 11 is a diagram for describing an operating method of managing, by an advertisement management device, advertisement information through a game server and a platform server, according to an embodiment.

FIG. 11 is a diagram for describing an operating method of managing, by an advertisement management device, advertisement information through a game server and a platform server, according to an embodiment.

Referring to FIG. 11, in step S1101, the game server 20 may collect log data of a plurality of users for a certain game. In step S1102, the game server 20 may transmit the log data of the plurality of users to the advertisement management device 10.

In step S1103, the advertisement management device 10 may set at least one group for the certain game, based on the log data of the plurality of users. In step S1104, the advertisement management device 10 may register advertisement information to be provided to the at least one group. In step S1105, the advertisement management device 10 may request the platform server 30 to provide advertisement information for each of the at least one group.

In step S1106, the platform server 30 may transmit the advertisement information for each of the at least one group in response to a request from the advertisement management device 10. In step S1107, the platform server 30 may obtain feedback information by monitoring behavior of a user in response to an advertisement being transmitted to the user. The platform server 30 may transmit the feedback information to the advertisement management device 10.

In step S1108, the game server 20 may continuously transmit the log data of the plurality of users to the advertisement management device 10 even after the advertisement management device 10 requests the platform server 30 to provide the advertisement information.

In step S1109, the advertisement management device 10 may obtain performance information for the certain game, based on the log data of the plurality of users and the feedback information.

In step S1110, the advertisement management device 10 may perform management of the advertisement information, based on the performance information.

Figure 12:
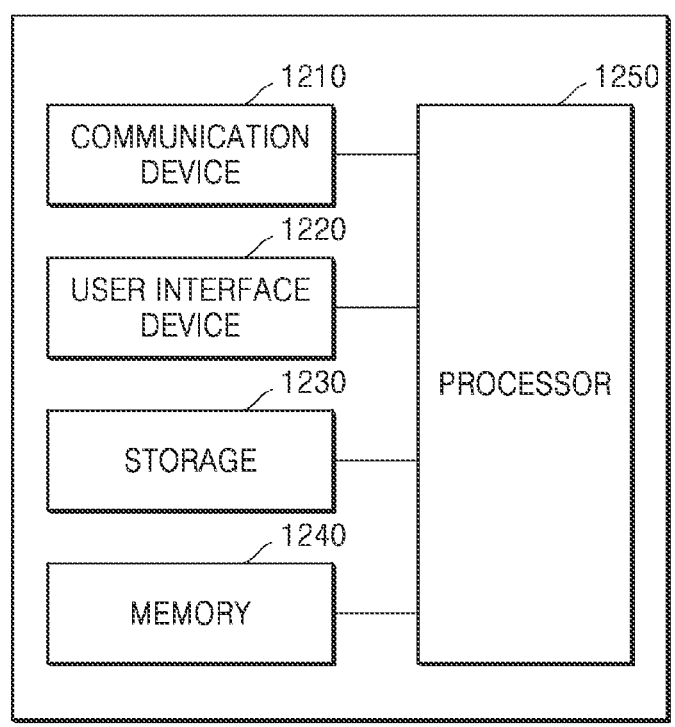
FIG. 12 is a block diagram illustrating a configuration of an advertisement management device, according to an embodiment.

FIG. 12 is a block diagram illustrating a configuration of an advertisement management device, according to an embodiment.

The advertisement management device 10 illustrated in FIG. 12 may include a communication device 1210, a user interface device 1220, a storage 1230, a memory 1240, and a processor 1250. However, not all of the components illustrated in FIG. 12 are essential components. The advertisement management device 10 may be embodied by more components than the illustrated components, or may be embodied by less components than the illustrated components.

The communication device 1210 may communicate with an external device. Particularly, the communication device 1210 may be connected to a network by wire or wirelessly to communicate with the external device. Here, the external device may include a game server, a platform server, a smart phone, a tablet PC, a PC, or the like. The communication device 1210 may include a communication module that supports one of various wired/wireless communication methods. For example, the communication module may be in the form of a chipset or may be a sticker/barcode including information necessary for communication (e.g., a sticker including an NFC tag). Also, the communication module may include a short-range communication module or a wired communication module.

For example, the communication device 1210 may support at least one of wireless local area network (LAN), Wi-Fi, Wi-Fi direct (WFD), Bluetooth, BLE, wired LAN, NFC, Zigbee, infrared data association (IrDA), 3G, 4th generation (4G), and 5th generation (5G).

The storage 1230 may store log data of a plurality of users received from a game server, group information of a user for a certain game, advertisement information registered for each group, information about a platform server, feedback information received from the platform server, performance information about a certain advertisement, or the like. The storage 1230 may store information associated with a program and an application, which are used to manage an advertisement for each group through the platform server. The storage 1230 may store a program executed in the advertisement management device 10, an application, and various data used in the platform server.

The user interface device 1220 may receive, from a manager, an input of data in order to control the advertisement management device 10.

The processor 1250 may control the user interface device 1220 to generate and output a user interface screen for receiving an input of a certain command or data from the manager. The user interface device 1220 may include an input device for receiving an input of controlling an operation of the advertisement management device 10 and an output device for displaying information about a result according to the operation of the advertisement management device 10 or a state of the advertisement management device 10. For example, the user interface device 1220 may include an operation panel that receives a manager input and a display panel that displays a screen.

Particularly, the input device may include devices capable of receiving various forms of user inputs such as a touch screen, a camera, or a microphone. Also, the output device may include, for example, a display panel or a speaker. However, the user interface device 1220 is not limited thereto, but may include a device supporting various input/output.

The memory 1240 may store software or a program. The memory 1240 may register an advertisement to be provided to a group set for a certain game, and may store at least one program for managing the advertisement, based on feedback information in response to the advertisement being provided. The at least one program stored in the memory 1240 may be classified into a plurality of modules according to functions.

The processor 1250 may control an overall operation of the advertisement management device 10, and may include at least one processor such as a central processing unit (CPU). The processor 1250 may include at least one specialized processor corresponding to each function or may be a processor in the form of a single integral unit.

The processor 1250 may execute a program stored in the memory 1240, read data or a file stored in the memory 1240, or store a new file in the memory 1240. The processor 1250 may execute instructions stored in the memory 1240.

The processor 1250 may set at least one group for a certain game, based on log data of a plurality of users received from the certain game.

For example, the processor 1250 may determine at least one parameter used for setting a group from among a user's access rate in the certain game, a user's access time in the certain game, an item purchased by a user and a purchase amount of the item in the certain game, and a user's game level and character in the certain game.

As a specific example, the processor 1250 may obtain feature information of a group to be set. For example, the user interface device 1220 may receive the feature information about a first group. The processor 1250 may determine a parameter necessary for setting a group from the feature information. For example, the processor 1250 may determine a parameter necessary for extracting the first group of users from the plurality of users.

The processor 1250 may obtain, from the log data of the plurality of users, a value of at least one parameter for the plurality of users. The processor 1250 may set the at least one group for the certain game, based on the value of the at least one parameter for the plurality of users.

The processor 1250 may obtain detailed setting information for the determined parameter. Here, the detailed setting information may be automatically set by the advertisement management device 10 or may be set by a manager.

The processor 1250 may extract users satisfying a setting condition of a parameter from log data of a plurality of users within a search period, and may generate a certain group including the extracted users. For example, the advertisement management device 10 may generate a first group based on a setting condition of the first group.

For example, the processor 1250 may display a user interface receiving an input of information used to set at least one group through the user interface device 1220.

The processor 1250 may register advertisement information to be provided to at least one group.

For example, the processor 1250 may determine a first advertisement associated with an increase in activity of a certain game for users in the first group, based on log data of the users in the first group.

The processor 1250 may register first advertisement information including the first advertisement and an execution condition of the first advertisement for the first group.

For example, the processor 1250 may display a user interface receiving an input of information used to register an advertisement of at least one group through the user interface device 1220.

The processor 1250 may request a plurality of platform servers capable of providing advertisements through the communication device 1210 to provide advertisement information for each of the at least one group.

For example, the processor 1250 may encrypt user information about the first group according to a first encryption method. The processor 1250 may transmit, to the plurality of platform servers, the encrypted user information of the first group and the first advertisement information to be provided to the first group through the communication device 1210.

For example, the processor 1250 may request the plurality of platform servers to provide users mapped with the first group of users with the first advertisement information, based on a result of comparing the encrypted user information within a platform server according to the first encryption method and the encrypted user information of the first group through the communication device 1210.

The processor 1250 may obtain, from the plurality of platform servers, feedback information of advertisements provided for each of the at least one group through the communication device 1210.

For example, the processor 1250 may obtain, from the plurality of platform servers, the feedback information monitored by transmitting a certain advertisement to the users in the at least one group through the communication device 1210. The processor 1250 may display the feedback information for each of the at least one group through the user interface device 1220.

For example, the feedback information may include at least one piece of information among the number of clicks on a certain advertisement provided by a certain platform server, the number of actions corresponding to the certain advertisement, the number of installations of an application of a certain game by the certain advertisement, and an advertising cost generated by the certain platform server.

The processor 1250 may perform management of the advertisement information registered for each of the at least one group, based on the feedback information.

For example, the processor 1250 may obtain performance information used to determine the efficiency of an advertisement for the certain game for each of the at least one group, based on log data of a user belonging to the at least one group, after the advertisement information being transmitted. The processor 1250 may perform management of the advertisement information for each of the at least one group, based on the performance information.

For example, when a value of a first performance parameter for the first advertisement provided to the first group is less than a certain reference value, the processor 1250 may interrupt the first advertisement or replace the first advertisement with a second advertisement.

As another example, when the value of the first performance parameter for the first advertisement provided to the first group is greater than the certain reference value, the processor 1250 may maintain the first advertisement.

The advertisement management device 10, the game server 20, and the platform server 30 described hereinbefore may be embodied by a hardware component, a software component, and/or a combination of the hardware component and the software component. For example, the device and components described in the embodiments may be implemented by using one or more general-purpose computers or special purpose computers, for example, a processor, a controller, an arithmetic logic unit (ALU), a digital signal processor, a microcomputer, a field programmable gate array (FPGA), a programmable logic unit (PLU), a microprocessor, or another device capable of executing and responding instructions. A processing device may perform on an operating system (OS) and one or more software applications performed on the OS. Furthermore, the processing device, in response to execution of software, may access, store, manipulate, process, and generate data. For convenience of understanding, although one processing device is described to be used as the processing device, one skilled in the art may understand that the processing device includes a plurality of processing elements and/or multiple types of processing elements. For example, the processing device may have a plurality of processors or a single processor and a single controller. Furthermore, another processing configuration such as a parallel processor may be configured herein.

The software may include a computer program, code, an instruction, or a combination of one or more thereof, and the software may configure a processing device so that the processing device may be operated as intended, or may independently or collectively command the processing device. In order to be interpreted by the processing device or in order to provide instructions or data to the processing device, the software and/or data may be permanently or temporarily embodied in any type of machine, a component, physical equipment, virtual equipment, a computer storage medium or device, or a transmitted signal wave. As the software is distributed on a computer system connected to a network, the software may be stored or executed in a distribution method. The software and data may be stored in one or more computer-readable recording media.

The method according to the embodiment may be realized in a program command format that may be executed by using various computing means, so as to be recorded in a computer-readable recording medium. The computer-readable recording medium may independently or collectively include a program command, a data file, a data structure, and the like. The program command being recorded in the medium may correspond to a program command that is specifically designed and configured for the embodiments, or may correspond to a program command that is disclosed and available to one skilled in the art related to computer software. Examples of the computer-readable recording medium may include magnetic media, such as hard discs, floppy discs, and magnetic tapes, optical media, such as CD-ROMs, DVDs, and so on, magneto-optical media, such as floptical discs, and hardware devices specially configured for storing and executing program commands, such as ROMs, RAMs, flash memories, and so on. An example of a computer program may include not only machine code created by a compiler but also high-level programming language executable by a computer using an interpreter. The hardware apparatus may be configured to operate as one or more software modules to perform operations of the embodiments, or vice versa.

A certain targeted advertisement may be provided to users in a group set for a certain game through a platform server.

Based on feedback information of the advertisement provided through the platform server, an advertisement management device may perform advertisement management to thereby increase the efficiency of the advertisement.

The advertisement management device may set advertisements, provide the advertisements, and manage the advertisements in an efficient manner with respect to a certain group within the certain game.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An operating method of an advertisement management device, the operating method comprising:
   primarily receiving log data from a game server at a first log data transmission timing, which is after the game server collects the log data of a plurality of users including a record of a user's activities performed in a certain game;
   displaying a user interface receiving an input of information;
   based on the primarily received log data of a plurality of users collected from the certain game, generating at least one group data for the certain game, using the user interface;
   registering advertisement information to be provided to the at least one group data, using the user interface;
   transmitting request data to request a plurality of platform servers capable of providing advertisement information to provide the advertisement information for each of the at least one group data;
   secondarily receiving log data from the game server at a second log data transmission timing, which is after the advertisement management device requests the platform server to provide the advertisement information for the at least one group data;
   obtaining, from the plurality of platform servers, feedback information of the advertisement information provided for each of the at least one group data; and
   based on the feedback information, providing instruction data to perform management of the advertisement information registered for each of the at least one group data by:
      after the advertisement information being transmitted, based on the secondarily received log data of a user belonging to the at least one group data, obtaining performance information used to determine an efficiency of the advertisement information for the certain game for each of the at least one group data; and
      based on the performance information, providing instruction data to perform management of the advertisement information for each of the at least one group data by:
      when a value of a first performance parameter for a first advertisement information provided to a first group data of the at least one group data is less than a certain reference value, providing instruction data to interrupt the first advertisement being currently transmitted through one of the plurality of platform servers or replace the first advertisement information with a second advertisement information; and
      when the value of the first performance parameter for the first advertisement information provided to the first group data is greater than the certain reference value, providing instruction data to maintain the first advertisement information,
   wherein the first group data has a plurality of feature information in which a relationship in which opposite features about a user are extracted from a comparison of log data of a first search period and log data of a second search period is formed,
   wherein the registering advertisement information to be provided to the at least one group data comprises:
      based on log data of users in the first group data, determining the first advertisement information associated with an increase in activity of the certain game for the users in the first group data; and
      registering the first advertisement information and an execution condition of the first advertisement information for the first group data,
   wherein the generating at least one group data for the certain game comprises receiving an input phrase including the plurality of feature information about one group data, the plurality of feature information in which the relationship in which opposite features about the user are extracted from the comparison of the log data of the first search period and the log data of the second search period is formed, using the user interface.

2. The operating method of claim 1,
   wherein the displaying the user interface comprises:
      receiving an input of selecting an item purchase promotion from an advertisement list using the user interface; and
      when the input of selecting the item purchase promotion is received from the advertisement list, using the user interface, displaying the performance information regarding the item purchase promotion with respect to the first group data in which the relationship in which opposite features about the user are extracted from the comparison of the log data of the first search period and the log data of the second search period is formed,
   wherein the first group data has the plurality of feature information in which (i) the relationship in which opposite features about the user are extracted from the comparison of the log data of the first search period and the log data of the second search period, (ii) a relationship in which features of game levels corresponding to categories about a user are relatively different from each other based on the log data of the first search period, or a combination relationship thereof is formed,
   wherein the generating of the at least one group data for the certain game comprises outputting the first group data including the plurality of feature information, the plurality of feature information in which (i) the relationship in which opposite features about the user are extracted from the comparison of the log data of the first search period and the log data of the second search period, (ii) the relationship in which features of game levels corresponding to categories about the user are relatively different from each other based on the log data of the first search period, or the combination relationship thereof is formed, using the user interface,
   wherein the generating of the at least one group data for the certain game comprises:
      determining at least one parameter used for setting a group data from among a user's access rate in the certain game, a user's access time in the certain game, an item purchased by a user and a purchase amount of the item in the certain game, and a user's game level and character in the certain game; and
      setting at least one group data for the certain game, based on a value of the at least one parameter for the plurality of users obtained from the log data of the plurality of users.

3. The operating method of claim 1, wherein the transmitting request data to request the plurality of platform servers to provide the advertisement information for each of the at least one group data comprises:

encrypting user information about a first group data according to a first encryption method; and transmitting, to the plurality of platform servers, the encrypted user information about the first group data and the first advertisement information to be provided to a user in the first group data.

4. The operating method of claim 3, wherein the transmitting request data to request the plurality of platform servers to provide the advertisement information for each of the at least one group data further comprises requesting the plurality of platform servers to provide users mapped with the first group data of users with the first advertisement information, based on a result of comparing the encrypted user information within a platform server according to the first encryption method with the encrypted user information about the first group data.

5. The operating method of claim 1, wherein the obtaining, from the plurality of platform servers, of the feedback information of advertisement information provided for each of the at least one group data comprises:

obtaining, from the plurality of platform servers, the feedback information monitored by transmitting certain advertisement information to users in the at least one group data; and displaying the feedback information for each of the at least one group data.

6. The operating method of claim 5, wherein the feedback information comprises at least one piece of information among a number of clicks on the certain advertisement information provided by a certain platform server, a number of actions corresponding to the certain advertisement information, a number of installations of an application of a certain game by the certain advertisement information, and an advertising cost generated by the certain platform server.

7. A computer program stored in a medium to execute an operating method of an advertisement management device in combination with the advertisement management device, which, when executed by the advertisement management device, cause the advertisement management device to perform the operating method of claim 1.

8. A computer-readable recording medium having recorded thereon a program for executing an operating method of an advertisement management device on the advertisement management device, the recording medium comprising:

primarily receiving log data from a game server at a first log data transmission timing, which is after the game server collects the log data of a plurality of users including a record of a user's activities performed in a certain game;

displaying a user interface receiving an input of information;

based on the primarily received log data of a plurality of users collected from the certain game, generating at least one group data for the certain game, using the user interface;

registering advertisement information to be provided to the at least one group data, using the user interface;

transmitting request data to request a plurality of platform servers capable of providing advertisement information to provide the advertisement information for each of the at least one group data;

secondarily receiving log data from the game server at a second log data transmission timing, which is after the advertisement management device requests the platform server to provide the advertisement information for the at least one group data;

obtaining, from the plurality of platform servers, feedback information of the advertisement information provided for each of the at least one group data; and based on the feedback information, providing instruction data to perform management of the advertisement information registered for each of the at least one group data by:

after the advertisement information being transmitted, based on the secondarily received log data of a user belonging to the at least one group data, obtaining performance information used to determine an efficiency of an advertisement for the certain game for each of the at least one group data; and based on the performance information, providing instruction data to perform management of the advertisement information for each of the at least one group data by:

when a value of a first performance parameter for a first advertisement information provided to a first group data of the at least one group data is less than a certain reference value, providing instruction data to interrupt the first advertisement being currently transmitted through one of the plurality of platform servers or replace the first advertisement with a second advertisement; and when the value of the first performance parameter for the first advertisement information provided to the first group data is greater than the certain reference value, providing instruction data to maintain the first advertisement information, wherein the first group data has a plurality of feature information in which a relationship in which opposite features about a user are extracted from a comparison of log data of a first search period and log data of a second search period is formed, wherein the registering advertisement information to be provided to the at least one group data comprises:

based on log data of users in the first group data, determining the first advertisement information associated with an increase in activity of the certain game for the users in the first group data; and registering the first advertisement information and an execution condition of the first advertisement information for the first group data, wherein the generating at least one group data for the certain game comprises receiving an input phrase including the plurality of feature information about one group data, the plurality of feature information in which the relationship in which opposite features about the user are extracted from the comparison of the log data of the first search period and the log data of the second search period is formed, using the user interface.

9. An advertisement management device comprising:

a communication device for performing communication with a plurality of platform servers that provide advertisement information;

a storage;

a user interface device;

a processor; and a memory for storing instructions executable by the processor, wherein the communication device receives primarily receives log data from a game server at a first log data transmission timing, which is after the game server collects the log data of a plurality of users including a record of a user's activities performed in a certain game, wherein the processor, by executing the instructions, is configured to, based on the primarily received log data of a plurality of users collected from the certain game, generate at least one group data for the certain game, register advertisement information to be provided to the at least one group data, transmit request data to request the plurality of platform servers to provide the advertisement information for each of the at least one group data through the communication device, wherein the communication device receives secondarily receives log data from the game server at a second log data transmission timing, which is after the advertisement management device requests the platform server to provide the advertisement information for the first group data, wherein the processor, by executing the instructions, is configured to, obtain, from the plurality of platform servers, feedback information of the advertisement information provided for each of the at least one group data through the communication device, and based on the feedback information, provide instruction data to perform management of the advertisement information registered for each of the at least one group data by:

after the advertisement information being transmitted, based on the secondarily received log data of a user belonging to the at least one group data, obtaining performance information used to determine an efficiency of the advertisement information for the certain game for each of the at least one group data; and based on the performance information, performing management of the advertisement information for each of the at least one group data by:

when a value of a first performance parameter for a first advertisement information provided to a first group data of the at least one group data is less than a certain reference value, providing instruction data to interrupt the first advertisement being currently transmitted through one of the plurality of platform servers or replace the first advertisement information with a second advertisement information; and when the value of the first performance parameter for the first advertisement information provided to the first group data is greater than the certain reference value, providing instruction data to maintain the first advertisement information, wherein the first group data has a plurality of feature information in which a relationship in which opposite features about a user are extracted from a comparison of log data of a first search period and log data of a second search period is formed, wherein the processor, by executing the instructions, is configured to:

based on log data of users in the first group data, determine the first advertisement information associated with an increase in activity of the certain game for the users in the first group data; and register the first advertisement information and an execution condition of the first advertisement information for the first group data, wherein the user interface device receives an input phrase including the plurality of feature information about one group data, the plurality of feature information in which the relationship in which opposite features about the user are extracted from the comparison of the log data of the first search period and the log data of the second search period is formed.

10. The advertisement management device of claim 9, wherein the user interface device receives an input of selecting an item purchase promotion from an advertisement list, wherein the user interface device, when the input of selecting the item purchase promotion is received from the advertisement list, displays the performance information regarding the item purchase promotion with respect to the first group data in which the relationship in which opposite features about the user are extracted from the comparison of the log data of the first search period and the log data of the second search period is formed, wherein the first group data has the plurality of feature information in which (i) the relationship in which opposite features about the user are extracted from the comparison of the log data of the first search period and the log data of the second search period, (ii) a relationship in which features of game levels corresponding to categories about a user are relatively different from each other based on the log data of the first search period, or a combination relationship thereof is formed, wherein the user interface device outputs the first group data including the plurality of feature information, the plurality of feature information in which (i) the relationship in which opposite features about the user are extracted from the comparison of the log data of the first search period and the log data of the second search period, (ii) the relationship in which features of game levels corresponding to categories about the user are relatively different from each other based on the log data of the first search period, or the combination relationship thereof is formed, wherein the processor, by executing the instructions, is configured to determine at least one parameter used for setting a group data from among a user's access rate in the certain game, a user's access time in the certain game, an item purchased by a user and a purchase amount of the item in the certain game, and a user's game level and character in the certain game, and based on a value of the at least one parameter for the plurality of users obtained from the log data of the plurality of users, set at least one group data for the certain game.

11. The advertisement management device of claim 9, wherein the processor, by executing the instructions, is configured to, based on log data of users in a first group data, determine a first advertisement information associated with an increase in activity of the certain game for the users in the first group data, and register the first advertisement information and an execution condition of the first advertisement information for the first group data.

12. The advertisement management device of claim 9, wherein the processor, by executing the instructions, is configured to display a user interface receiving an input of information used to set the at least one group data or register the advertisement information of the at least one group data through the user interface device.

13. The advertisement management device of claim 9, wherein the processor, by executing the instructions, is configured to encrypt user information about a first group data according to a first encryption method, and transmit, to the plurality of platform servers, the encrypted user information about the first group data and first advertisement information to be provided to a user in the first group data through the communication device.

14. The advertisement management device of claim 13, wherein the processor, by executing the instructions, is configured to request the plurality of platform servers to provide users mapped with the first group data of users with the first advertisement information, based on a result of comparing the encrypted user information within a platform server according to the first encryption method with the encrypted user information about the first group data.

15. The advertisement management device of claim 9, wherein the processor, by executing the instructions, is configured to obtain, from the plurality of platform servers, the feedback information monitored by transmitting certain advertisement information to users in the at least one group data through the communication device, and display the feedback information for each of the at least one group data through the user interface device.

16. The operating method of claim 1, wherein generating at least one group data for the certain game comprises:

extracting parameters necessary for generating the one group data from the input phrase including the plurality of feature information; and setting detailed setting condition information for the extracted parameters.

17. The recording medium of claim 8, wherein generating at least one group data for the certain game comprises:

extracting parameters necessary for generating the one group data from the input phrase including the plurality of feature information; and setting detailed setting condition information for the extracted parameters.

18. The advertisement management device of claim 9, wherein the processor, by executing the instructions, is configured to, extract parameters necessary for generating the one group data from the input phrase including the plurality of feature information; and set detailed setting condition information for the extracted parameters.

* * * * *